(12) United States Patent
Sorimoto

(10) Patent No.: US 11,383,409 B2
(45) Date of Patent: Jul. 12, 2022

(54) UNDERCUT PROCESSING MECHANISM, MOLDING DIE, AND MOLDED PRODUCT

(71) Applicant: TECHNOCRATS CORPORATION, Hiroshima (JP)

(72) Inventor: Masanori Sorimoto, Hiroshima (JP)

(73) Assignee: TECHNOCRATS CORPORATION, Hiroshima (JP)

( * ) Notice: Subject to any disclaimer, the term of this patent is extended or adjusted under 35 U.S.C. 154(b) by 449 days.

(21) Appl. No.: 15/821,004

(22) Filed: Nov. 22, 2017

(65) Prior Publication Data

US 2018/0147750 A1 May 31, 2018

(30) Foreign Application Priority Data

Nov. 28, 2016 (JP) .............................. JP2016-229675

(51) Int. Cl.
*B29C 33/48* (2006.01)
*B29C 45/44* (2006.01)
(Continued)

(52) U.S. Cl.
CPC .......... *B29C 33/48* (2013.01); *B22D 17/2236* (2013.01); *B22D 17/24* (2013.01);
(Continued)

(58) Field of Classification Search
CPC ..... B29C 33/48; B29C 45/4435; B29C 45/04; B29C 33/305; B29C 33/20; B29C 33/485;
(Continued)

(56) References Cited

U.S. PATENT DOCUMENTS 3,966,385 A * 6/1976 Spears .................. B29C 33/485
425/393
4,456,214 A * 6/1984 Ruck ..................... B29C 33/485
249/144
(Continued)

FOREIGN PATENT DOCUMENTS

CN      103732373 A    4/2014
EP      2 735 414 A1   5/2014
(Continued)

OTHER PUBLICATIONS

Translation of JP 2011-218704 (Year: 2011).*
(Continued)

*Primary Examiner* — Niki Bakhtiari
*Assistant Examiner* — John J DeRusso

(57) ABSTRACT

An undercut processing mechanism is attached to and used in a molding die for forming a molded product having an undercut portion, and allows demolding of the undercut portion. The undercut processing mechanism includes: a holder attached to or formed integrally with the molding die; a sliding piece configured to be slidable relative to the holder such that a mold core is moved so as to demold the undercut portion; a retaining piece configured to retain the sliding piece such that the sliding piece is slidable; and a support wall configured to support the sliding piece so as to prevent the sliding piece from being tilted when the sliding piece slides. The sliding piece forms a part of the mold core for forming the undercut portion.

10 Claims, 25 Drawing Sheets

(51) Int. Cl.

| | |
|---|---|
| *B29C 33/20* | (2006.01) |
| *B22D 17/24* | (2006.01) |
| *B22D 17/22* | (2006.01) |
| *B22D 29/00* | (2006.01) |
| *B29C 33/30* | (2006.01) |
| *B29C 45/04* | (2006.01) |

(52) U.S. Cl.
CPC .............. *B22D 29/00* (2013.01); *B29C 33/20* (2013.01); *B29C 33/305* (2013.01); *B29C 45/04* (2013.01); *B29C 45/4435* (2013.01); *B22D 17/22* (2013.01)

(58) Field of Classification Search
CPC .... B29C 33/44; B22D 17/2236; B22D 17/24; B22D 29/00; B22D 17/22
See application file for complete search history.

(56) References Cited

U.S. PATENT DOCUMENTS

| | | | | |
|---|---|---|---|---|
| 4,919,608 | A * | 4/1990 | Catalanotti | B29C 33/485 249/176 |
| 5,090,888 | A * | 2/1992 | Pfannkuchen | B22D 17/22 164/303 |
| 5,814,357 | A * | 9/1998 | Boskovic | B29C 45/4435 264/318 |
| 6,039,558 | A | 3/2000 | Park et al. | |
| 8,926,316 | B2 | 1/2015 | Sorimoto | |
| 2006/0172038 | A1* | 8/2006 | Funo | B29C 45/4435 425/577 |
| 2011/0003027 | A1* | 1/2011 | Navarra Pruna | B29C 45/4435 425/556 |
| 2014/0141115 | A1* | 5/2014 | Sorimoto | B29C 45/4471 425/441 |
| 2016/0016226 | A1* | 1/2016 | Aspach | B22C 9/103 164/302 |

FOREIGN PATENT DOCUMENTS

| | | |
|---|---|---|
| JP | 11-105085 | 4/1999 |
| JP | 2002-127204 | 5/2002 |
| JP | 2008-307767 | 12/2008 |
| JP | 2010-83033 | 4/2010 |
| JP | 2010-155381 | 7/2010 |
| JP | 2011-218704 | 11/2011 |
| JP | 2013-22865 | 2/2013 |
| JP | 2014-113788 | 6/2014 |
| JP | 2016-87919 | 5/2016 |
| KR | 10-2014-0037840 A | 3/2014 |

OTHER PUBLICATIONS

European Office Action dated Apr. 15, 2019 in corresponding European Patent Application No. 17203169.2 (6 pages).
Extended European Search Report dated Apr. 18, 2018, in corresponding European Patent Application No. 17203169.2, 7 pgs.
Office Action dated Aug. 17, 2018 in corresponding Korean Patent Application No. KR 10-2017-0160607, 13 pgs.
Chinese Office Action dated Aug. 2, 2019 in corresponding Chinese Patent Application No. 201711210897.0.
Korean Office Action dated Feb. 22, 2019 in corresponding Korean Patent Application No. 10-2017-0160607 (4 pages).
Communication Pursuant to Article 94(3) EPC, dated Jan. 24, 2020, in corresponding European Application No. 17203169.2 (6 pp.).
Office Action, dated Mar. 12, 2020, in corresponding Chinese Application No. 201711210897.0 (12 pp.).
Office Action, dated Aug. 20, 2020, in corresponding Chinese Application No. 201711210897.0 (10 pp.).
Notice of Reasons for Refusal, dated Sep. 30, 2020, in corresponding Japanese Application No. 2016-229675 (12 pp.).
Communication pursuant to Article 94(3) EPC, dated Sep. 30, 2020, in corresponding European Application No. 17 2031 69.2 (6 pp.).
Decision of Re-Examination dated Dec. 4, 2020, in Chinese Patent Application No. 201711210897.0; 2 pages (including translation.
Communication pursuant to Article 94(3) EPC dated Jul. 6, 2021, in European Patent Application No. 17 203 169.2 (4 pages).
Chinese Office Action dated May 17, 2022 in Chinese Patent Application No. 202011307484.6 (7 pages, 1 page partial English translation).

\* cited by examiner

UNDERCUT PROCESSING MECHANISM, MOLDING DIE, AND MOLDED PRODUCT

CROSS REFERENCE TO THE RELATED APPLICATION

This application is based on and claims Convention priority to Japanese patent application No. 2016-229675, filed Nov. 28, 2016, the entire disclosure of which is herein incorporated by reference as a part of this application.

BACKGROUND OF THE INVENTION

Field of the Invention

The present invention relates to: an undercut processing mechanism that is attached to and used in a molding die for forming a molded product having an undercut portion; a molding die; and a molded product.

Description of Related Art

For a molding die for forming a molded product having an undercut portion, undercut processing mechanisms that correspond to forms of undercut portions have been developed. In the undercut processing mechanism, a structure that allows a movement stroke to be great while being compact is required in order to easily demold the undercut portion in a limited installation space.

In, for example, JP Laid-open Patent Publication No. 2013-022865, an undercut processing mechanism has been suggested in which, when an undercut portion of a molded product has such a shape that projects and is recessed on both sides intersecting the demolding direction, the undercut portion can be easily demolded. According to JP Laid-open Patent Publication No. 2013-022865, a movement stroke can be made great while the mechanism is made compact.

The undercut processing mechanism disclosed in JP Laid-open Patent Publication No. 2013-022865 includes a holder disposed in a stationary mold or a movable mold of a molding die, a pair of mold cores for forming an undercut portion, and a retaining piece that is accommodated in the holder, retains the mold cores, and is movable in a demolding direction. The paired mold cores are guided by guiding member in the holder according to movement of the retaining piece, and move in the opposite directions, respectively, so as to pass each other in the front-rear direction such that one of the paired mold cores moves from one end side of the retaining piece to the other end side thereof, and the other of the paired mold cores moves from the other end side of the retaining piece to the one end side thereof, thereby allowing the undercut portion to be demolded.

The undercut processing mechanism disclosed in JP Laid-open Patent Publication No. 2013-022865 enables a movement stroke to be made great while the structure thereof is made compact, and simultaneously enables the undercut portion to be demolded, relative to a molded product having the undercut portion, in particular, a molded product in which an undercut portion has such a shape that projects and is recessed on both sides intersecting a demolding direction of the molding die. Thus, a molded product can be easily demolded in a limited installation space.

The present invention is made to suggest a structure that stably operates the undercut processing mechanism disclosed in JP Laid-open Patent Publication No. 2013-022865 and an undercut processing mechanism having a sliding piece that projects from the holder and that slides in the holder similarly to the undercut processing mechanism disclosed in JP Laid-open Patent Publication No. 2013-022865.

SUMMARY OF THE INVENTION

An object of the present invention is to provide an undercut processing mechanism that can stably operate, a molding die having such an undercut processing mechanism, and a molded product formed by the use of this molding die.

The present invention is directed to an undercut processing mechanism that is attached to and used in a molding die for forming a molded product having an undercut portion, and that allows the undercut portion to be demolded. The undercut processing mechanism includes: a holder attached to the molding die or formed integrally with the molding die; a sliding piece configured to form a part of a mold core for forming the undercut portion, and configured to be slidable relative to the holder such that the mold core is moved so as to demold the undercut portion; a retaining piece configured to retain the sliding piece such that the sliding piece is slidable; and a support member configured to support the sliding piece so as to prevent the sliding piece from being tilted when the sliding piece slides.

The undercut processing mechanism of the present invention may further include a shaping piece attached to the sliding piece or formed integrally with the sliding piece, the shaping piece being configured to form a part of the mold core and have a shaping surface along a part of the molded product including the undercut portion.

The undercut processing mechanism of the present invention may further include the two or more sliding pieces that are slidably retained by the retaining piece.

In the undercut processing mechanism of the present invention, the support member may be attached to or formed in at least one of the sliding piece, the retaining piece, the holder and the molding die.

The undercut processing mechanism of the present invention may include a support wall attached to the retaining piece or formed integrally with the retaining piece, which support wall functions the support member.

In the undercut processing mechanism of the present invention, the holder may include a wall having an opening through which the sliding piece slides and passes, and an edge of the opening may function as the support member.

The undercut processing mechanism of the present invention may include, as the support member, at least one of a protrusion, a pin, a thickened portion, a padding portion, a dovetail groove and a projection attached to or formed in at least one of the sliding piece, the retaining piece, the holder and the molding die.

The undercut processing mechanism of the present invention may further include a core pin having an outer circumferential surface that has a shape along an inner circumferential surface of a cylindrical portion of the molded product having the cylindrical portion, and the core pin may be structured to pass through the holder and the retaining piece.

A molding die of the present invention includes the undercut processing mechanism.

A molded product of the present invention is formed by the undercut processing mechanism or the molding die.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
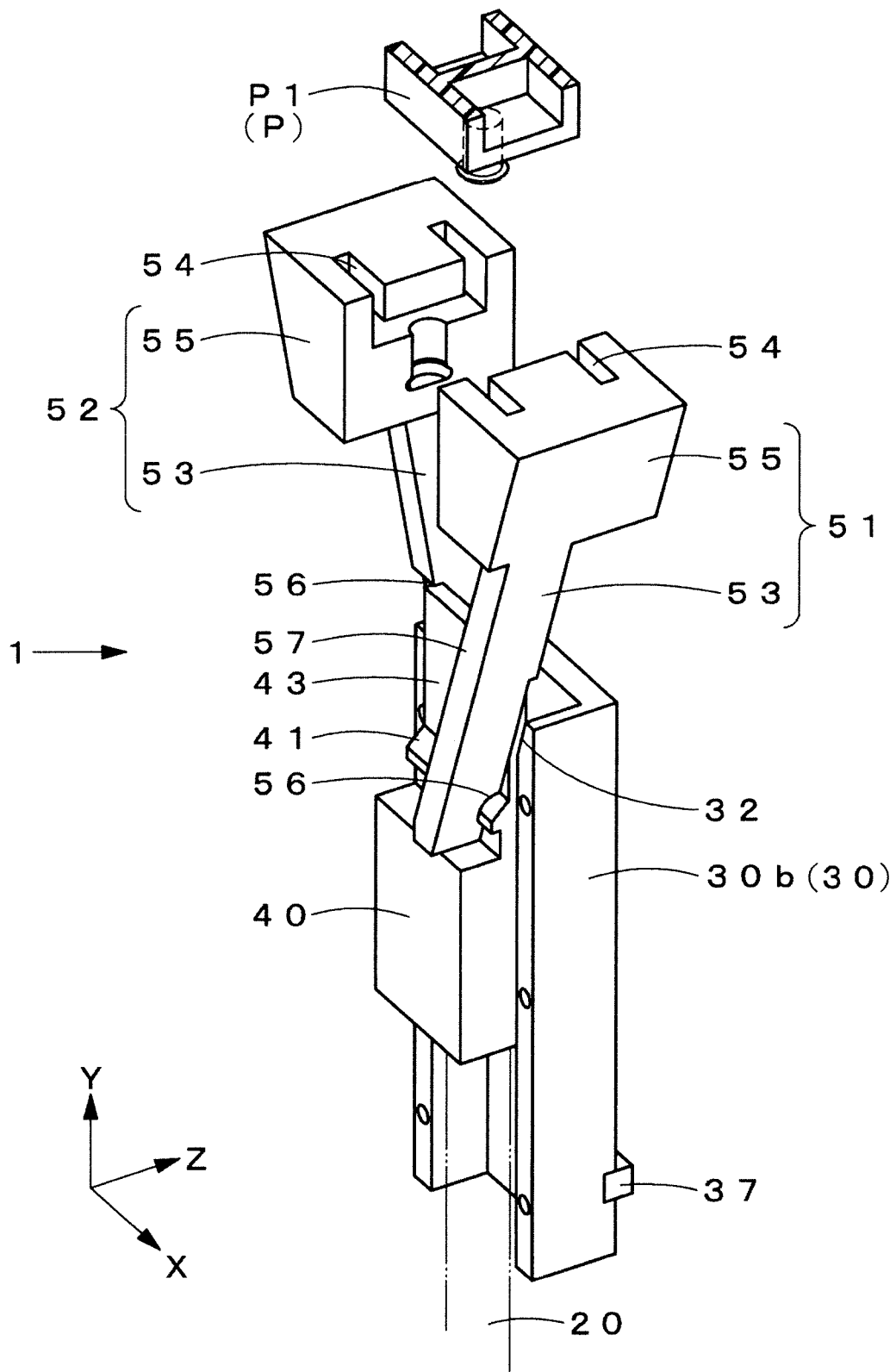
FIG. 1 is a perspective view of an undercut processing mechanism and a part of a molded product according to a first embodiment of the present invention.
Figure 2:
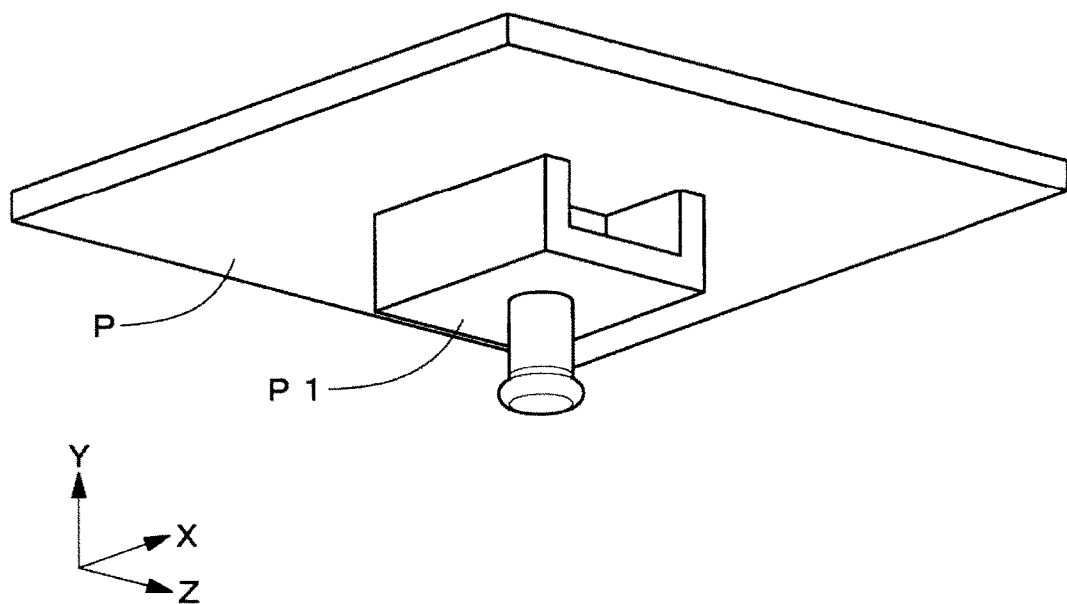
FIG. 2 is a perspective view of a molded product having an undercut portion.
Figure 3:
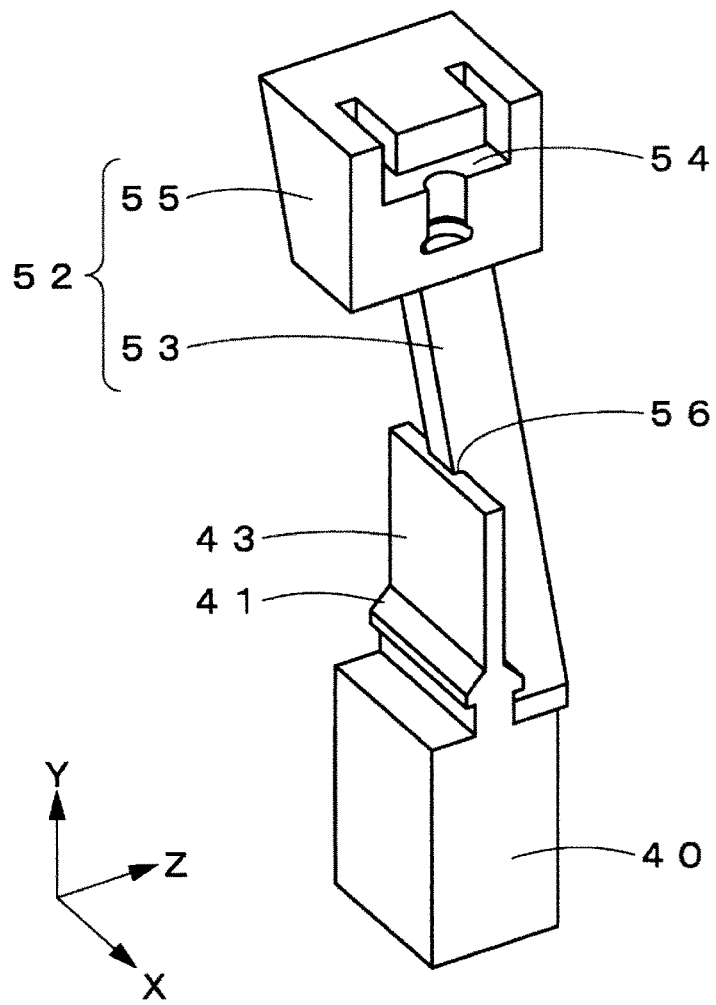
FIG. 3 is a perspective view of a retaining piece and one of mold cores in the undercut processing mechanism.
Figure 4:
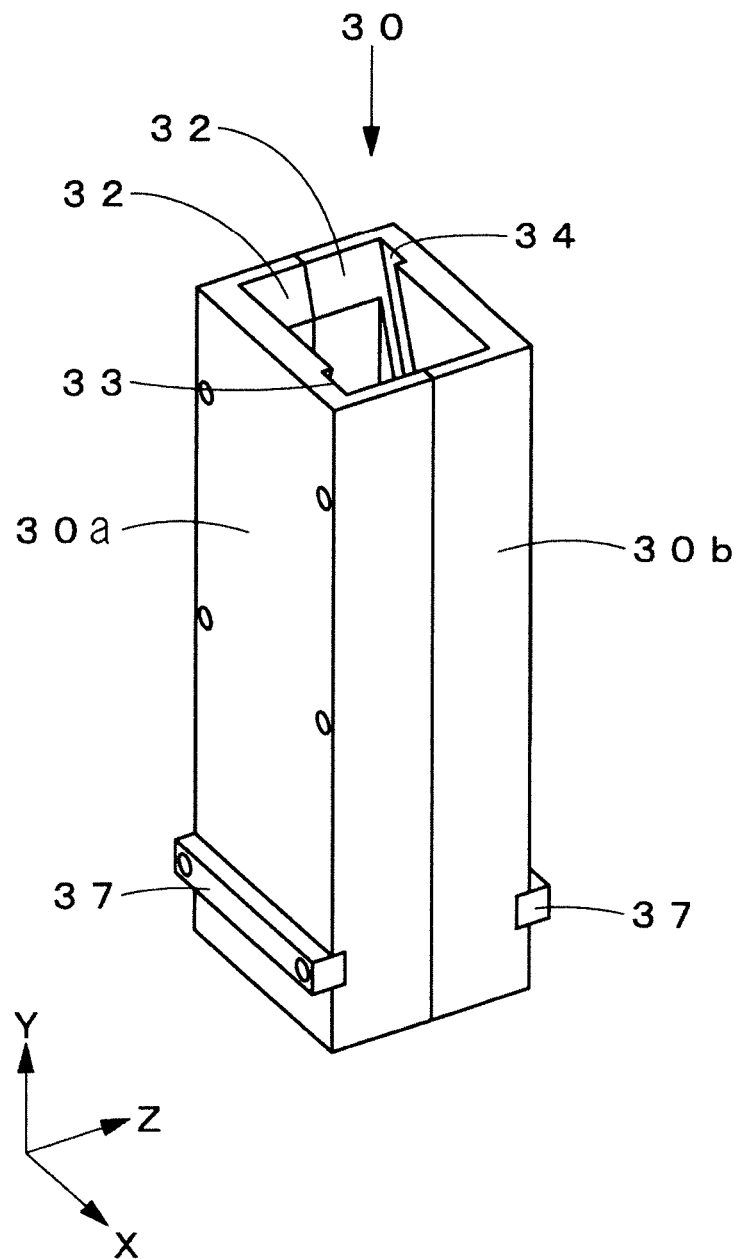
FIG. 4 is a perspective view of a holder of the undercut processing mechanism.
Figure 5:
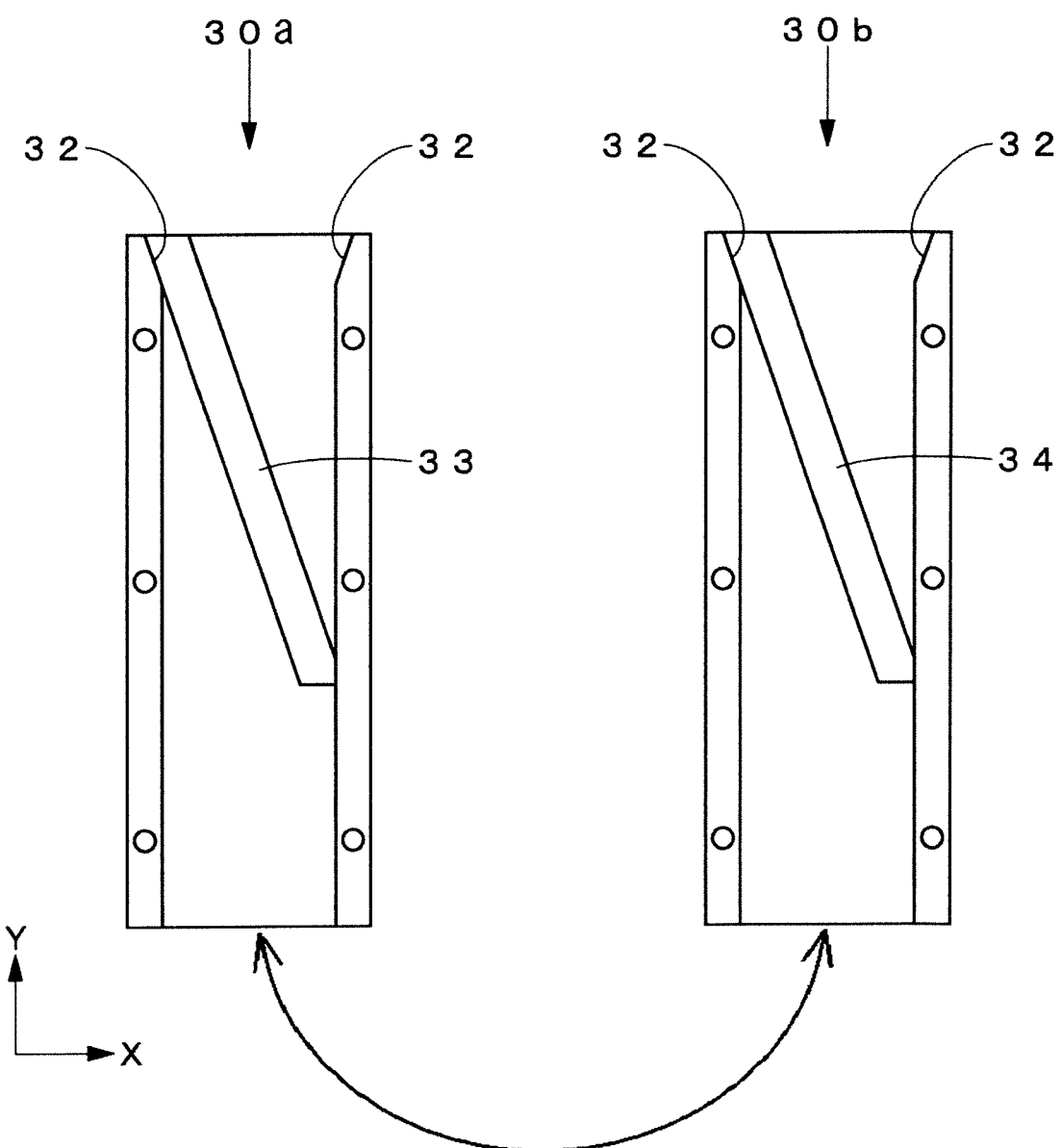
FIG. 5 is a front view of an inner side of a holder member of the undercut processing mechanism.

FIG. 1 is a perspective view of an undercut processing mechanism 1 and a part of a molded product P according to a first embodiment of the present invention. FIG. 2 is a perspective view of the molded product P having an undercut portion P1. FIG. 3 is a perspective view of a retaining piece 40 and one of mold cores, which is a mold core 52, in the undercut processing mechanism 1 shown in FIG. 1. FIG. 4 is a perspective view of a holder 30 of the undercut processing mechanism 1 shown in FIG. 1. FIG. 5 is a front view of inner sides of holder members 30a, 30b of the undercut processing mechanism 1 shown in FIG. 1.

Figure 6:
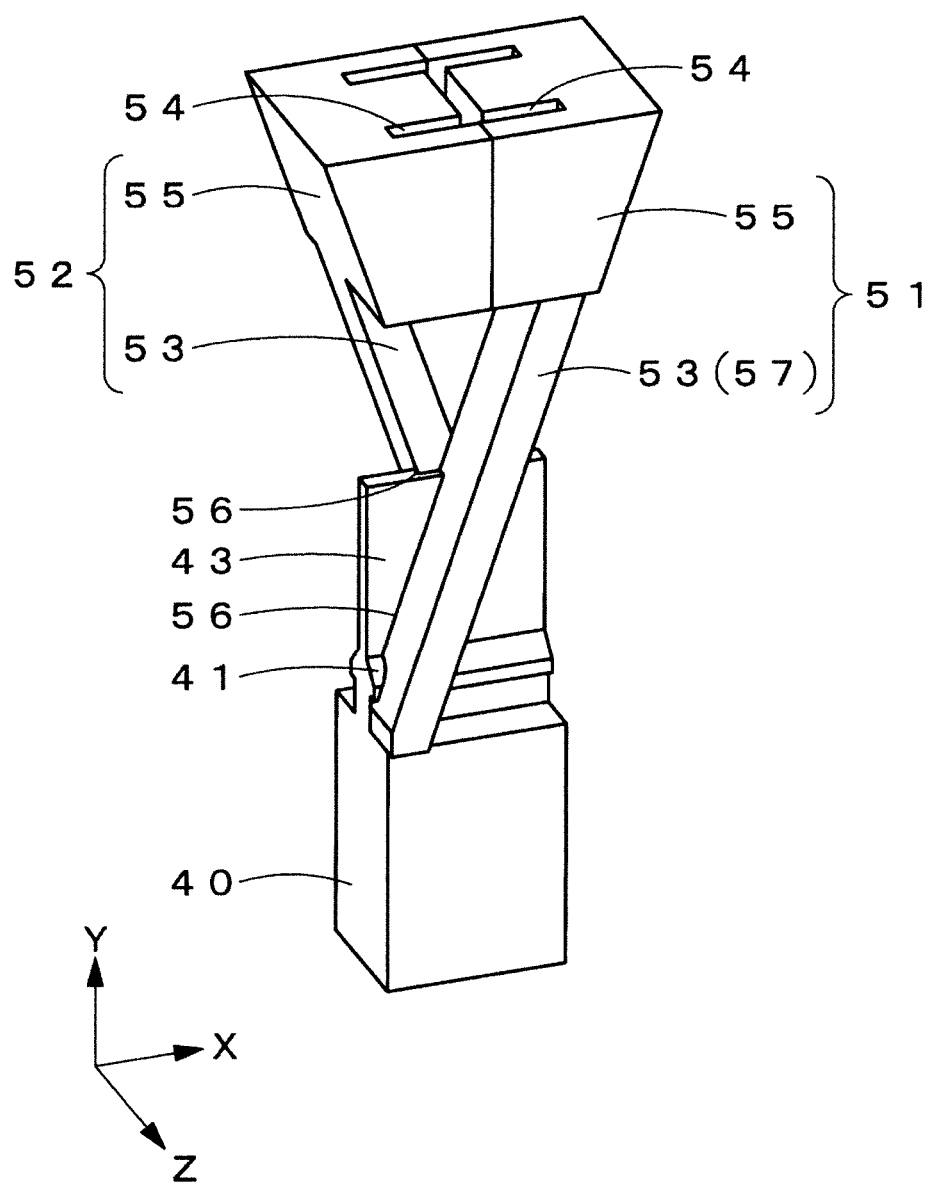
FIG. 6 is a perspective view of the retaining piece and the mold cores in a state where the undercut processing mechanism is closed.
Figure 7:
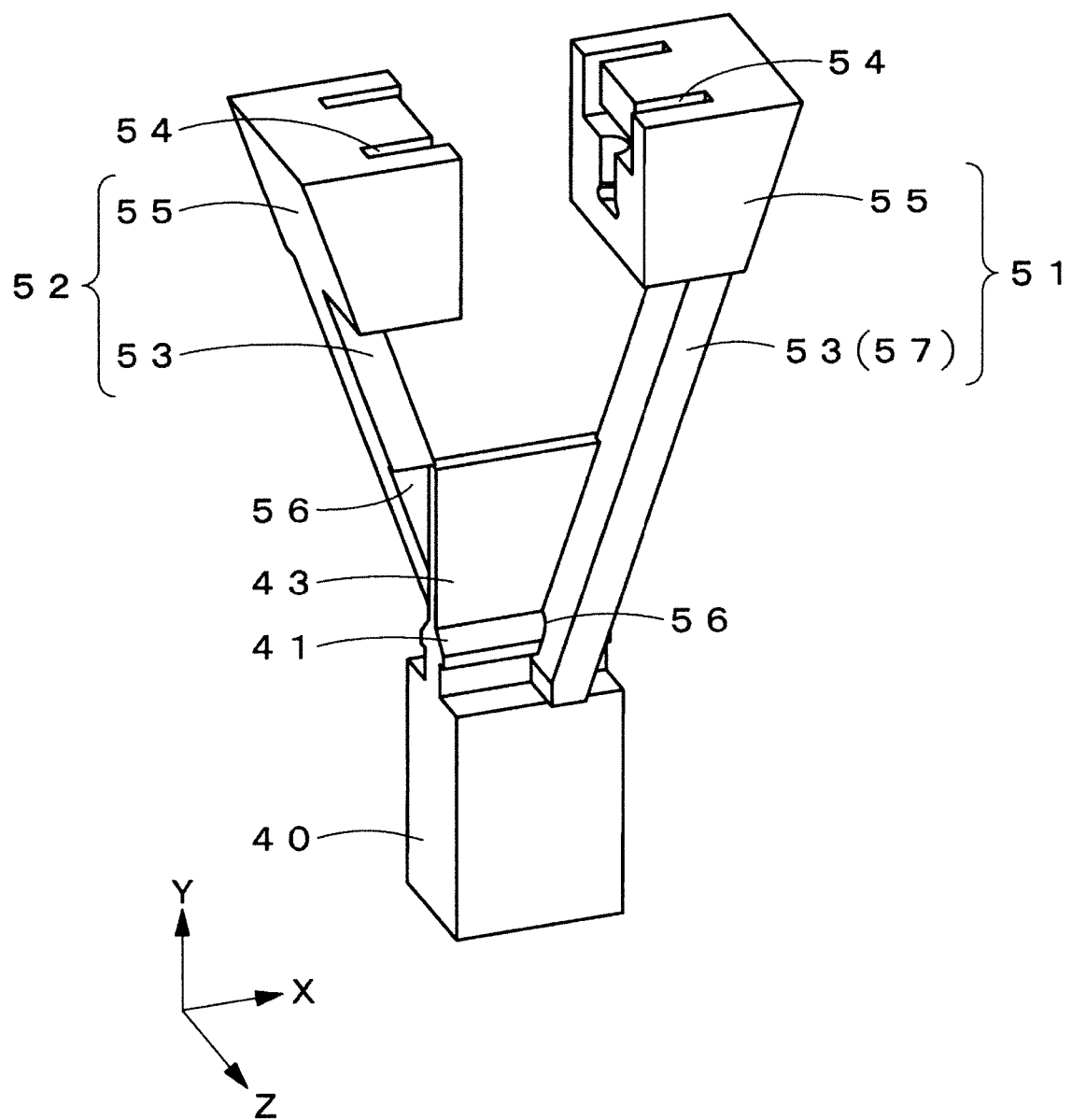
FIG. 7 is a perspective view of the retaining piece and the mold cores in a state where the undercut processing mechanism is opened.
Figure 8:
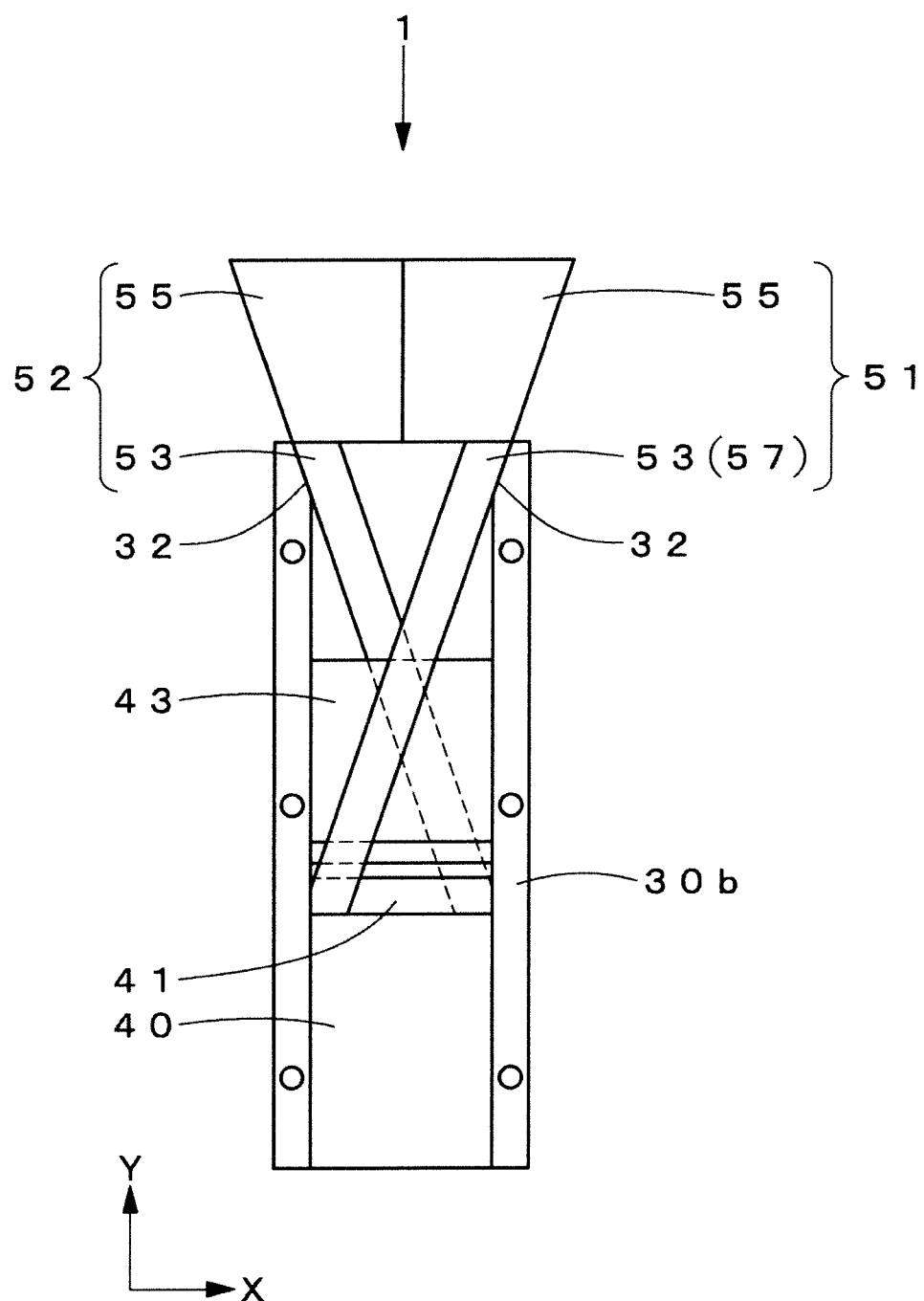
FIG. 8 is a front view of an inner side of the undercut processing mechanism in a closed state.
Figure 9:
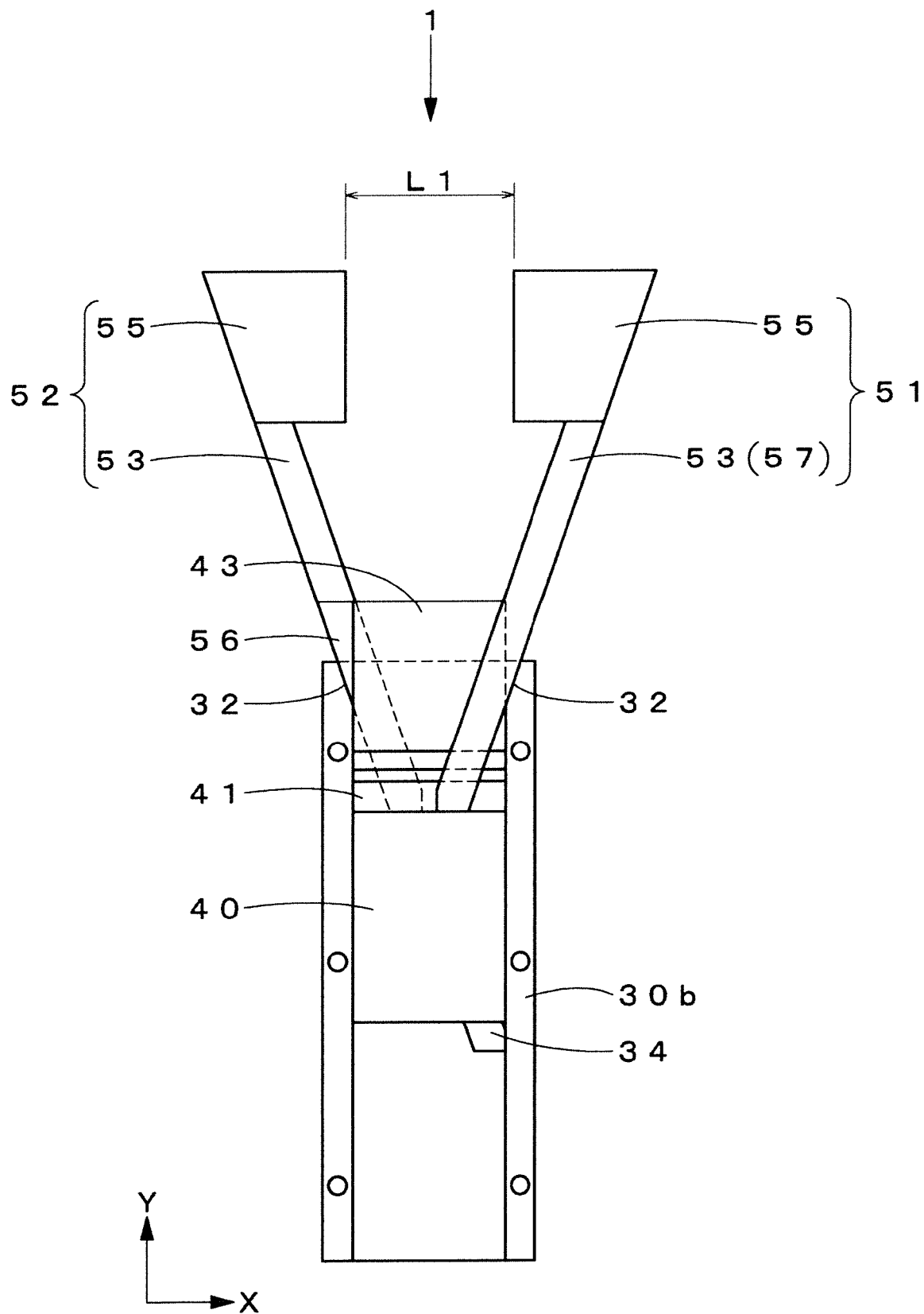
FIG. 9 is a front view of an inner side of the undercut processing mechanism in an opened state.

FIG. 6 is a perspective view of the retaining piece 40 and mold cores 51, 52 in a state where the undercut processing mechanism 1 shown in FIG. 1 is closed. FIG. 7 is a perspective view of the retaining piece 40 and the mold cores 51, 52 in a state where the undercut processing mechanism 1 shown in FIG. 1 is opened. FIG. 8 is a front view of an inner side of the undercut processing mechanism 1, shown in FIG. 1, which is in the closed state. FIG. 9 is a front view of an inner side of the undercut processing mechanism 1, shown in FIG. 1, which is in an opened state. In FIG. 1, FIG. 8, and FIG. 9, one of the holder members, which is the holder member 30a, is not shown.

The undercut processing mechanism 1 according to the first embodiment of the present invention is attached to a molding die (not shown) incorporated in a molding device (not shown) that forms the molded product P (see FIG. 2). The undercut processing mechanism 1 enables the undercut portion P1 to be demolded from the molding die when the molded product P is demolded. In the undercut processing mechanism 1 of the present embodiment, the molded product P has the undercut portion P1 that extends in the direction (X, Z directions in the drawings) perpendicular to the demolding direction (Y direction in the drawings) of the molding die. The undercut processing mechanism 1 is opened in the X direction when the molded product P is demolded, whereby the undercut portion P1 can be demolded from the molding die.

A material of the molded product P may be not only a synthetic resin such as plastic but also a metal such as iron, copper, or aluminium.

The molding die includes: a stationary mold for forming the outer surface side portion of the molded product P; a movable mold for forming the inner surface side portion including the undercut portion P1 of the molded product P; an ejector base plate disposed so as to be capable of reciprocating in the demolding direction (Y direction) with respect to the movable mold; and an ejector pin 20 fixed so as to be erected perpendicular to the ejector base plate. The molding die of the present embodiment is a standard molding die that allows the ejector pin 20 to be moved in the demolding direction to eject the molded product P as the ejector base plate is moved in the demolding direction.

The undercut processing mechanism 1 includes: the holder 30 that is tubular and box-shaped; the retaining piece 40 that is accommodated in the holder 30 so as to be movable; and a pair of the mold cores 51, 52 that are accommodated in the holder 30 so as to be connected to the retaining piece 40. By the mold cores 51, 52, the undercut portion P1 is surrounded from both sides thereof in the X direction and is molded. The holder 30 is provided in a movable mold of the molding die, and the retaining piece 40 is accommodated in the holder 30 so as to be fixed to the tip of the ejector pin 20 of the molding die. The retaining piece 40 reciprocates in the holder 30 in the demolding direction (Y direction) in conjunction with reciprocating of the ejector base plate (ejector pin 20) of the molding die. Thus, the mold cores 51, 52 are opened and closed in the X direction.

The holder 30 is formed by the two holder members 30a, 30b, having the same shape, being combined as shown in FIG. 4. The holder 30 is tubular and hollow-box-shaped such that the upper end face and the lower end face are opened in the Y direction. Tapers 32 are formed on an inner wall on both sides of the upper end opening of the holder 30. The tapers 32 allow the pair of mold cores 51, 52 to slide diagonally upward. The tapers 32 will be described below in detail. Blocks 37 are attached to the lower end side portion of the holder 30 so as to prevent the holder 30 from being removed from the movable mold.

On the inner wall of each of the holder members 30a, 30b, a guiding member that allows each of the mold cores 51, 52 to be movably guided, is provided. The guiding member will be described below in detail.

The retaining piece 40 is formed as a rectangular-parallelepiped-shaped member as shown in FIG. 1 and FIG. 3. The tip portion of the ejector pin 20 is fixed to the lower end side portion of the retaining piece 40 by means of a screw or the like. A projection 41 is formed on the upper end surface of the retaining piece 40 so as to extend in the X direction. The projection 41 is connected so as to allow the mold cores 51, 52 to move along the X direction.

The retaining piece 40 has a plate-shaped support wall 43 that projects from the upper surface of the projection 41 in the Y direction (upper direction). The support wall 43 supports the mold cores 51, 52 along the X direction so as to prevent the mold cores 51, 52 from being tilted during opening and closing operations. That is, the support wall 43 is implemented as support member that supports the mold cores 51, 52 so as to prevent the mold cores 51, 52 from being tilted while the mold cores 51, 52 are being opened and closed.

The support wall 43 is formed so as to support the mold cores 51, 52 over the entirety of an opening and closing stroke. The support wall 43 may be formed so as to support the mold cores 51, 52, in at least a range where supporting of the mold cores 51, 52 by the inner wall of the holder 30 is insufficient, within a range of the opening and closing strokes of the mold cores 51, 52. In other words, the support wall 43 may be formed such that the inner wall of the holder 30 and the support wall 43 assuredly prevent the mold cores 51, 52 from being tilted over the entirety of the opening and closing strokes.

The mold cores 51, 52 are formed as members having the same shape as shown in FIG. 1 and FIG. 3. The mold cores 51, 52 are connected so as to symmetrically oppose each other above the retaining piece 40. Specifically, the mold core 51 has a sliding piece 53 that extends in the Y direction so as to be tilted. A shaping piece 55 is formed integrally with the sliding piece 53 on the upper end side of the sliding piece 53. The shaping piece 55 has a recess 54 that corresponds to the outer shape of the undercut portion P1. The same applies to the other mold core which is the mold core 52.

In each of the mold cores 51, 52, the sliding piece 53 and the shaping piece 55 may be separately formed and connected to each other. In such a structure, molded products having different shapes can be formed by only the shaping pieces 55 being changed according to the shape of the molded product, thereby improving versatility. In a case where the sliding piece 53 or the shaping piece 55 is deformed or damaged, only a deformed or damaged one may be changed, thereby reducing cost for repair.

A recessed groove 56 is formed at the base end of the sliding piece 53 of each of the mold cores 51, 52. The recessed groove 56 engages slidably with the projection 41 and the support wall 43 of the retaining piece 40 such that each mold core is held at one side thereof. The mold cores 51, 52 each slide in a state where the recessed groove 56 is in surface contact with the support wall 43 of the retaining piece 40 when the mold cores 51, 52 are moved.

By such a fitting relationship between the recessed groove 56 of each of the mold cores 51, 52 and the projection 41 of the retaining piece 40, the base end side portions of the mold cores 51, 52 are connected so as to be slidable relative to the retaining piece 40 in the X direction. The mold cores 51, 52 can be each moved to the molding position (FIG. 6 and FIG. 8) and to the releasing position (FIG. 7 and FIG. 9). At the molding position, the mold cores 51, 52 contact with each other, in an opposing manner, in the holder 30 so as to surround the undercut portion P1 from both sides thereof. At the releasing position, the mold cores 51, 52 each project outward from the holder 30 and each separate from the undercut portion P1.

As shown in FIG. 6 to FIG. 9, when the mold cores 51, 52 are moved from the molding position to the releasing position, the base end side portions of the mold cores 51 and 52 are set to be moved in the opposite directions such that the base end side portion of one of the mold cores 51 and 52 is moved from one end side (X direction) of the projection 41 of the retaining piece 40 to the other end side (X direction) thereof, and the base end side portion of the other of the mold cores 51 and 52 is moved from the other end side of the projection 41 of the retaining piece 40 to the one end side thereof. That is, the recessed groove 56 at the base end of one of the mold cores, which is the mold core 51, is moved from the left end to the right end shown in FIGS. 6, 7, and the recessed groove 56 at the base end of the other of the mold cores, which is the mold core 52, is moved from the right end to the left end shown in FIGS. 6, 7. At this time, the base end of the mold core 51 and the base end of the mold core 52 pass each other.

As shown in FIG. 5, the guiding member is provided in the inner wall of each of the holder members 30a, 30b of the holder 30. The guiding member guides each of the mold cores 51, 52 along the diagonal direction from the molding position shown in FIG. 6 toward the releasing position shown in FIG. 7 when the molded product P is demolded. The diagonal direction is a direction in which the mold cores 51, 52 are moved simultaneously in the Y direction and the X direction. That is, the diagonal direction is a direction that extends in the Y direction diagonally toward the X direction.

The guiding member of the present embodiment is formed by a pair of first diagonal groove 33 and second diagonal groove 34 provided in the inner walls of the holder members 30a, 30b. The first diagonal groove 33 and the second diagonal groove 34 are shaped into recessed grooves that are recessed in the Z direction, so as to symmetrically extend. The first diagonal groove 33 and the second diagonal groove 34 are bilaterally symmetric and intersect each other so as to form an X-shape as viewed from the front of the holder 30.

As shown in FIG. 6 and FIG. 7, an outer wall 57 of the mold core 51, which is one of the mold cores 51, 52, extends in the diagonal direction in which the first diagonal groove 33 of the holder 30 extends, and is fitted into the first diagonal groove 33 so as to be slidable therein. The first diagonal groove 33 may be formed in the outer wall of the mold core 51 or the inner wall of the holder 30. In a case where the first diagonal groove 33 is formed in the outer wall of the mold core 51, the inner wall of the holder 30 is formed such that the inner wall is fitted into the first diagonal groove 33 so as to be slidable.

Similarly, the outer wall of the mold core 52, which is the other of the mold cores 51, 52, extends in the diagonal direction in which the second diagonal groove 34 of the holder 30 extends, and is fitted into the second diagonal groove 34 so as to be slidable therein. The second diagonal groove 34 may be formed in the outer wall of the mold core 52 or the inner wall of the holder 30. In a case where the second diagonal groove 34 is formed in the outer wall of the mold core 52, the inner wall of the holder 30 is formed such that the inner wall is fitted into the second diagonal groove 34 so as to be slidable.

An action of the undercut processing mechanism 1 of the present embodiment will be described by using an exemplary case where the molded product P is formed by using the molding die through injection molding. When the molded product P is formed by the molding device, the mold cores 51, 52 are supported, in the holder 30 provided inside the movable mold, at the molding position where the mold cores 51, 52 contact with each other in an opposing manner so as to surround the undercut portion P1 of the molded product P from both sides thereof (see FIG. 6, FIG. 8). In such a state, a cavity, of the molding die, which includes the recess 54 of the shaping piece 55 of each of the mold cores 51, 52, is filled with a melted material. Thereafter, the melted material is cooled and solidified, and the molded product P having the undercut portion P1 is formed.

When the molded product P has been formed, the stationary mold is separated from the movable mold. Thereafter, the ejector base plate is driven upward. With this drive of the ejector base plate, the ejector pin 20 that is erected on the ejector base plate allows ejecting operation to be performed linearly in the demolding direction (Y direction). In the holder 30, the retaining piece 40 fixed to the tip portion of the ejector pin 20 is moved in the demolding direction (Y direction) together with the ejector pin 20.

According to the retaining piece 40 being moved in the demolding direction, the pair of the mold cores 51, 52 connected to the projection 41 of the retaining piece 40 are moved in the diagonal direction from the molding position shown in FIG. 6, FIG. 8 toward the releasing position shown in FIG. 7, FIG. 9. That is, the mold cores 51, 52 are each moved so as to project outward from the holder 30 and simultaneously separate from the undercut portion P1.

Specifically, the outer wall 57 of the sliding piece 53 of one of the mold cores, which is the mold core 51, is guided along one of the diagonal directions which are bilaterally symmetric, while sliding in the first diagonal groove 33 of the holder 30. Simultaneously, the outer wall of the sliding piece 53 of the other of the mold cores, which is the mold core 52, is guided along the other of the diagonal directions, while sliding in the second diagonal groove 34 of the holder 30. The first diagonal groove 33 and the second diagonal groove 34 extend separately in the diagonal directions, respectively, which are bilaterally symmetric.

Thus, the mold cores 51, 52 are moved in the holder 30 so as to be assuredly guided smoothly in the diagonal directions by the outer wall 57 of each of the mold cores 51, 52 being fitted into the guiding member (the first diagonal groove 33, the second diagonal groove 34) in the inner wall of the holder 30. Further, load caused by demolding of the molded product P is dispersed without concentrating on one portion, thereby improving durability. Furthermore, enhancement of precision in designing is alleviated, and cost can be thus reduced.

The mold cores 51, 52 are shaped such that the sliding pieces 53 of the mold cores 51, 52 overlap each other in the front-rear direction (Z direction) across the retaining piece 40 as shown in FIG. 6 and FIG. 7. The sliding pieces 53 are connected so as to be slidable relative to the retaining piece 40 in the X direction. That is, when the mold cores 51, 52 are moved from the molding position to the releasing position, the sliding pieces 53 are moved in the opposite directions such that the base end of one of the sliding pieces 53 is moved from one end side (X direction) of the retaining piece 40 to the other end side thereof, and the base end of the other of the sliding pieces 53 is moved from the other end side of the retaining piece 40 to the one end side thereof, and the sliding pieces 53 pass each other in the front-rear direction.

Thus, the mold cores 51, 52 can be accommodated in the holder 30 so as to be compact without extending in the lateral direction (X direction). In addition, a great movement stroke can be assured during demolding. Therefore, even when the undercut portion P1 projects inward on the lower surface of the molded product P, and is greatly recessed and projects in a direction intersecting the demolding direction, the undercut portion P1 can be easily removed. As a result, the entirety of the molded product P can be easily demolded.

Specifically, as shown in FIG. 8 and FIG. 9, in the undercut processing mechanism 1 of the present embodiment, the mold cores 51, 52 are moved in the opposite directions such that one of the mold cores 51, 52 is moved from one end side (X direction) of the retaining piece 40 to the other end side thereof, and the other of the mold cores 51, 52 is moved from the other end side of the retaining piece 40 to the one end side thereof, and the mold cores 51, 52 pass each other in the front-rear direction. Thus, the mold cores 51, 52 separate from each other over up to a long distance L1.

Figure 10:
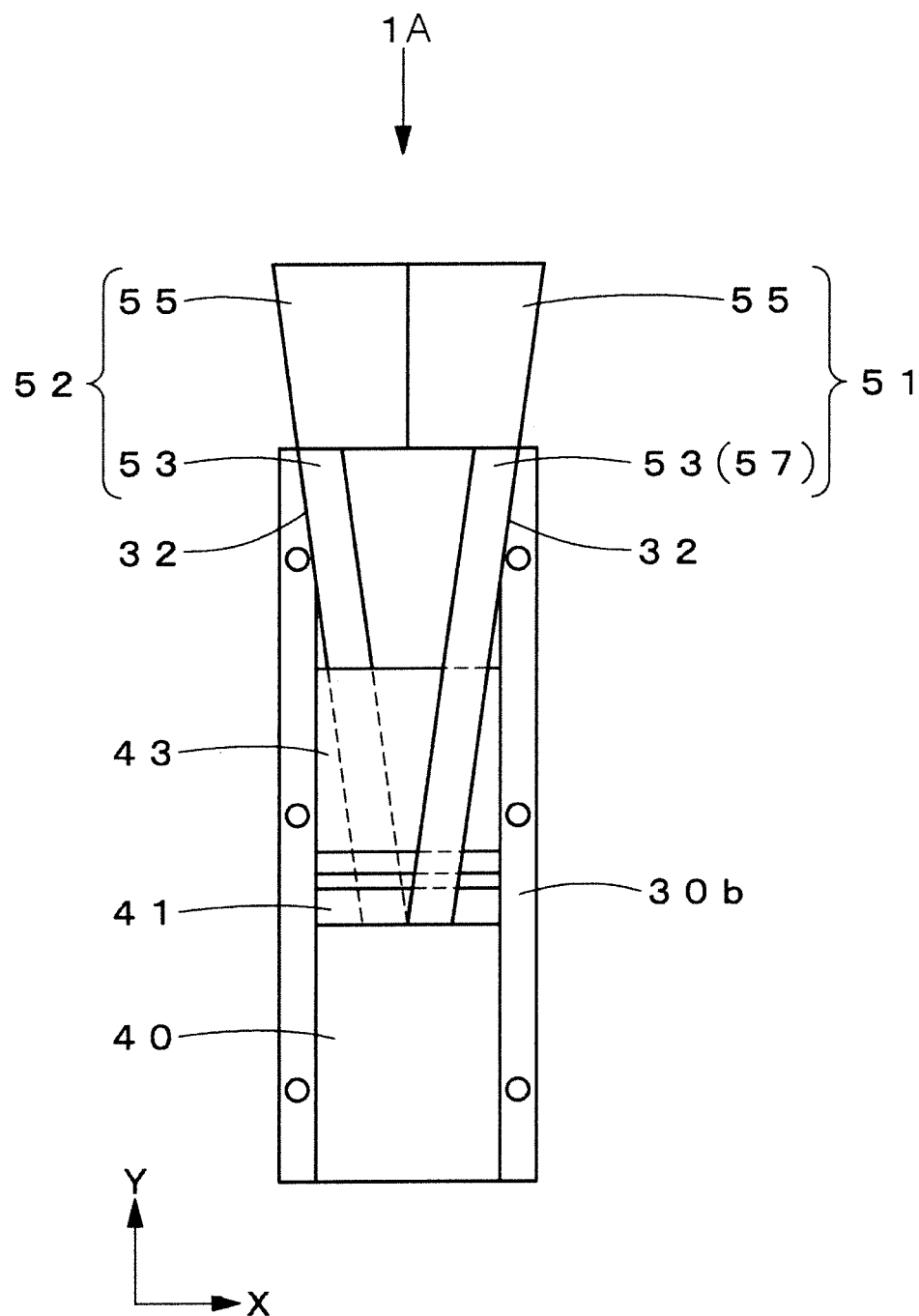
FIG. 10 is a front view of an inner side of an undercut processing mechanism in a closed state, according to modification in which a sliding piece is moved in a different manner.
Figure 11:
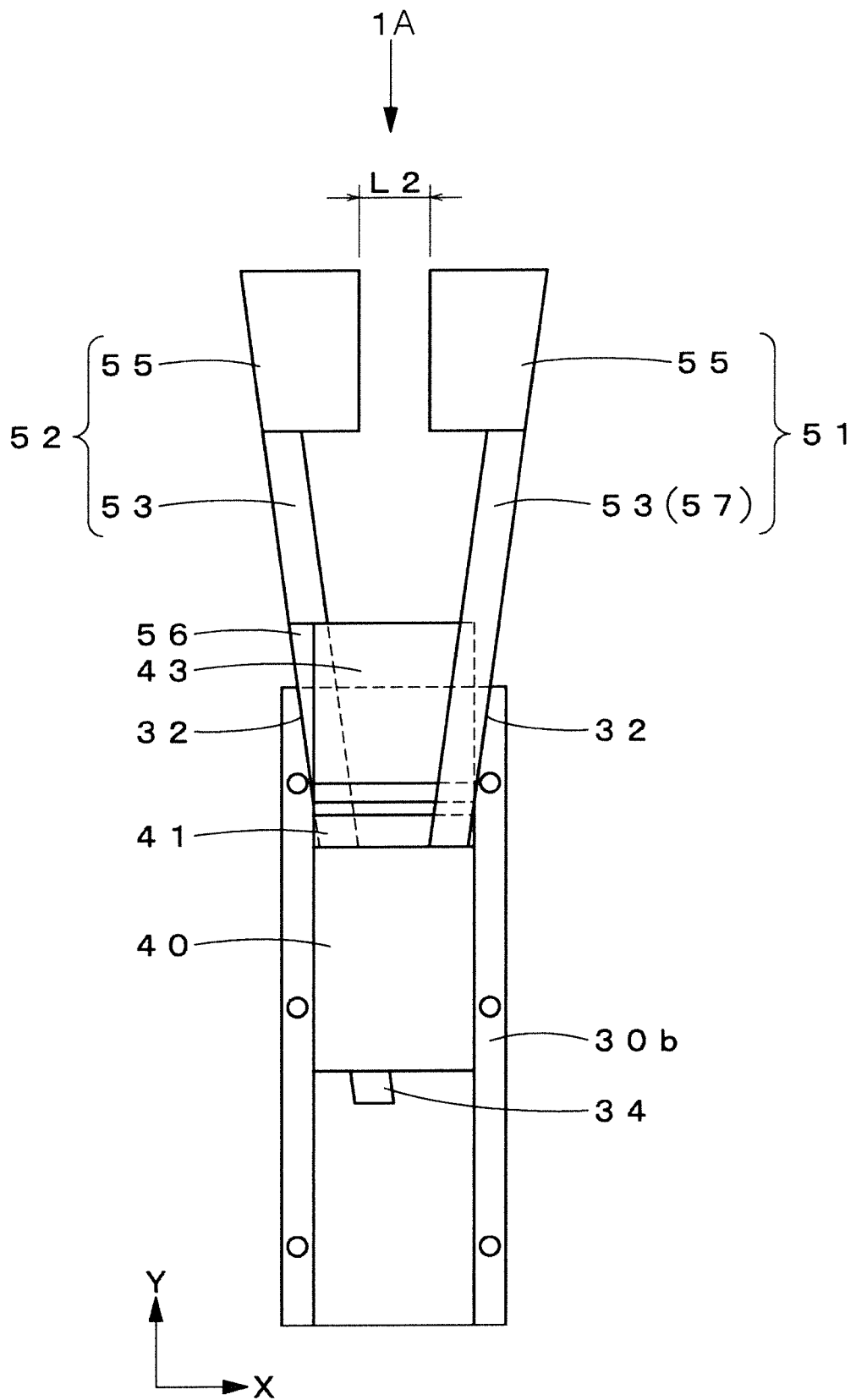
FIG. 11 is a front view of an inner side of the undercut processing mechanism, in an opened state, according to the modification.

FIG. 10 and FIG. 11 illustrate an undercut processing mechanism 1A, according to modification, in which the sliding pieces 53 are moved in a manner different from that for the undercut processing mechanism 1 shown in FIG. 1. FIG. 10 is a front view of an inner side of the undercut processing mechanism 1A in a closed state. FIG. 11 is a front view of an inner side of the undercut processing mechanism 1A in an opened state. In FIG. 10 and FIG. 11, one of the holder members, which is the holder member 30a, is not shown.

In the modification shown in FIG. 10 and FIG. 11, the mold cores 51, 52 are moved in opposite directions, respectively, from the center portion (X direction) of the retaining piece 40 to both ends thereof without passing each other in the front-rear direction. In this case, the mold cores 51, 52 separate from each other over only a shorter distance L2 as compared to the exemplary case shown in FIG. 9. However, the structure is rendered to be compact and is simplified.

In the undercut processing mechanism 1 according to the first embodiment shown in FIGS. 1 to 9, the mold cores 51, 52 are moved such that the outer wall 57 of each of the sliding pieces 53 comes into surface contact with the inner wall (the first diagonal groove 33 and the second diagonal groove 34) of the holder 30, and the recessed grooves 56 of the sliding pieces 53 come into surface contact with the support wall 43 of the retaining piece 40. In this state, the mold cores 51, 52 are slid, and are supported from both sides in the Z direction by the inner wall of the holder 30 and the support wall 43. Thus, the mold cores 51, 52 are assuredly prevented from being unstable and tilted.

In the undercut processing mechanism 1 of the present embodiment, the mold cores 51, 52 are not dispersed so as to be disposed in the ejector base plate and the movable mold, and can be disposed only in the movable mold via the holder 30 in a concentrated manner. Thus, the molding device can be made compact as a whole, and a space can be saved. As a result, processing on and incorporation into the molding die can be facilitated.

In particular, the undercut processing mechanism 1 can be structured as a unit in which the mold cores 51, 52 and the retaining piece 40 are previously incorporated in the holder 30 as shown in FIG. 1. Therefore, the undercut processing mechanism 1 can be easily attached later into a movable mold through the holder 30. Such a structure is appropriate in a case where the movable mold is small, that is, a case where the movable mold itself is provided with a space in which the holder 30 is to be accommodated.

When the molded product P has been removed, the ejector pin 20 is returned to a position for molding. With this return of the ejector pin 20, the mold cores 51, 52 and the retaining piece 40 are both drawn by the ejector pin 20 and returned to the initial position (see FIG. 6, FIG. 8). The stationary mold is also returned to the molding position, and the following molded product P is formed. The mold cores 51, 52 are each designed so as to have a length corresponding to a stroke that allows the entirety of the molded product P including the undercut portion P1 to be demolded. Thus, the undercut processing mechanism of the present embodiment can be adopted as appropriate in a range from a great stroke to a small stroke for demolding of the molded product P.

Figure 12:
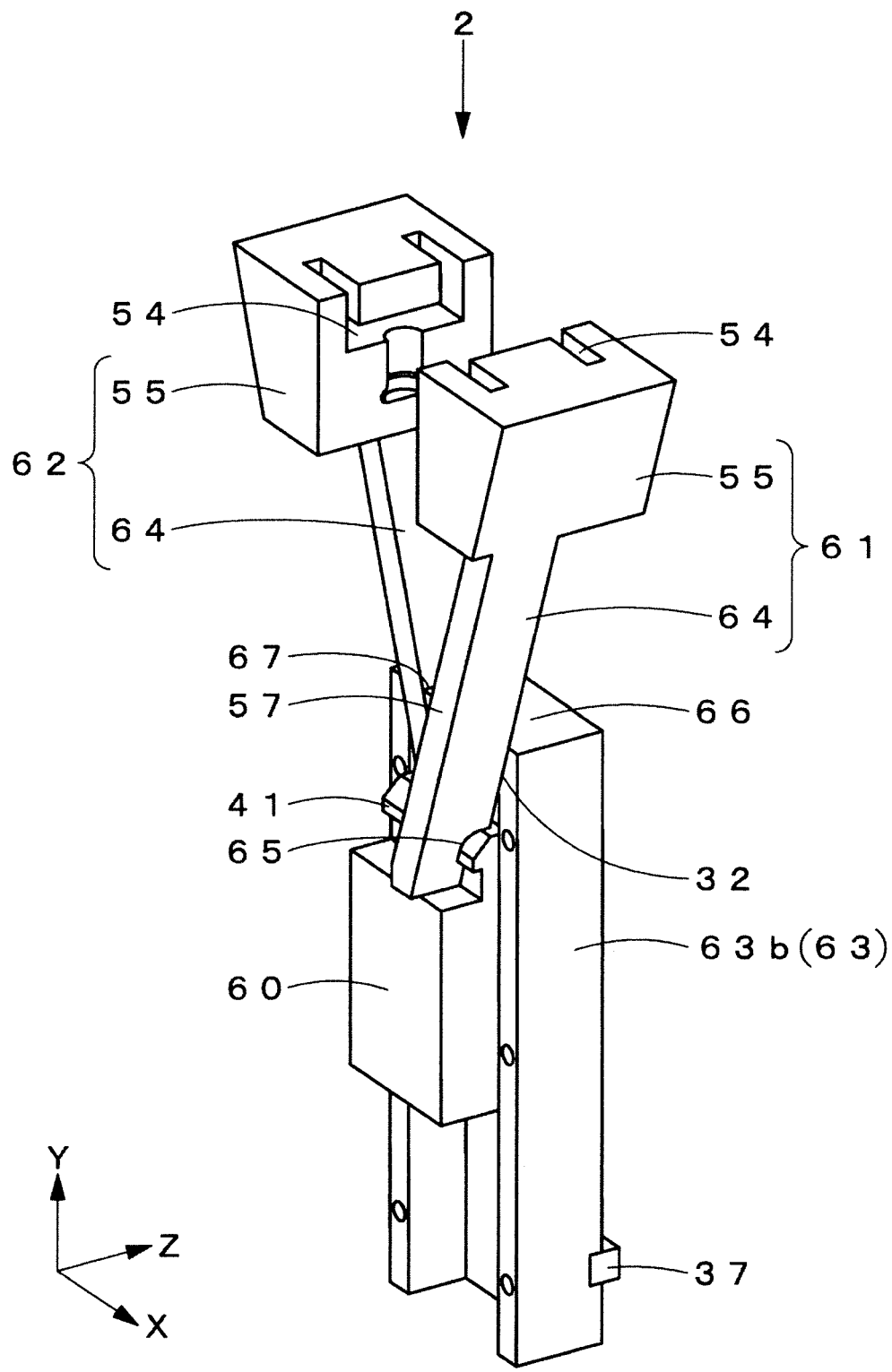
FIG. 12 is a perspective view of an undercut processing mechanism according to a second embodiment of the present invention.
Figure 13:
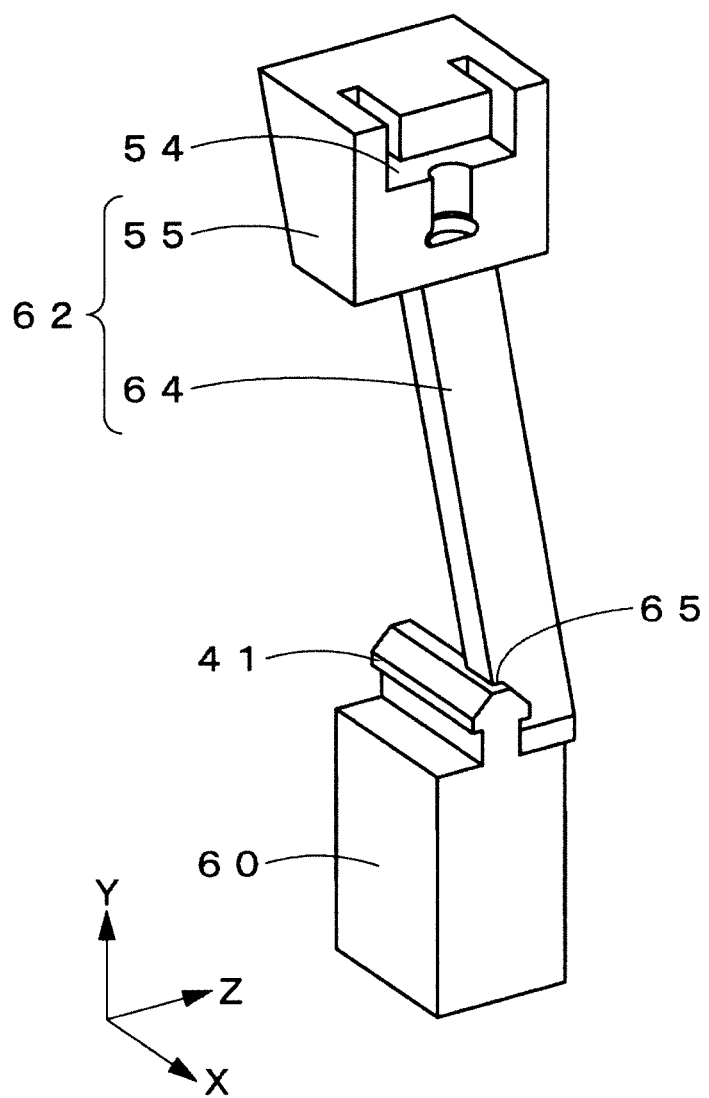
FIG. 13 is a perspective view of a retaining piece and one of mold cores in the undercut processing mechanism.
Figure 14:
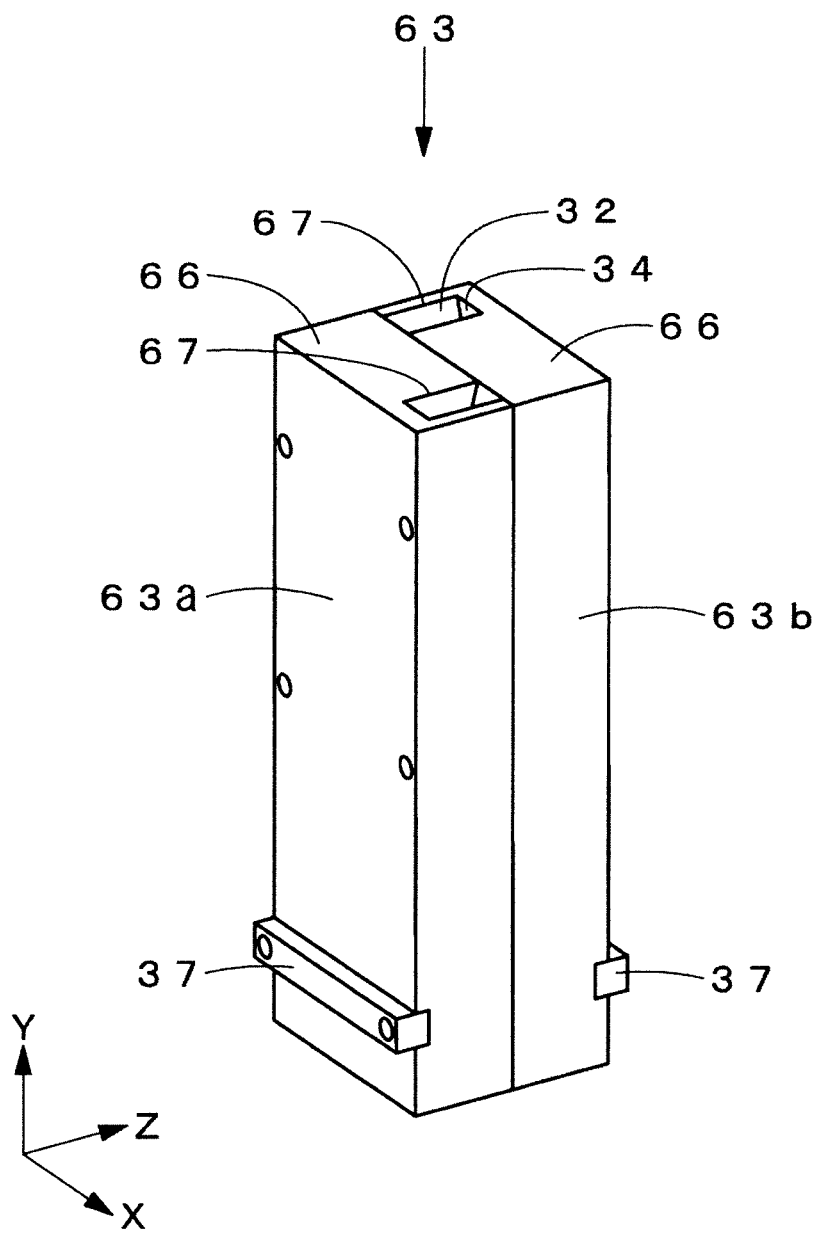
FIG. 14 is a perspective view of a holder of the undercut processing mechanism.
Figure 15:
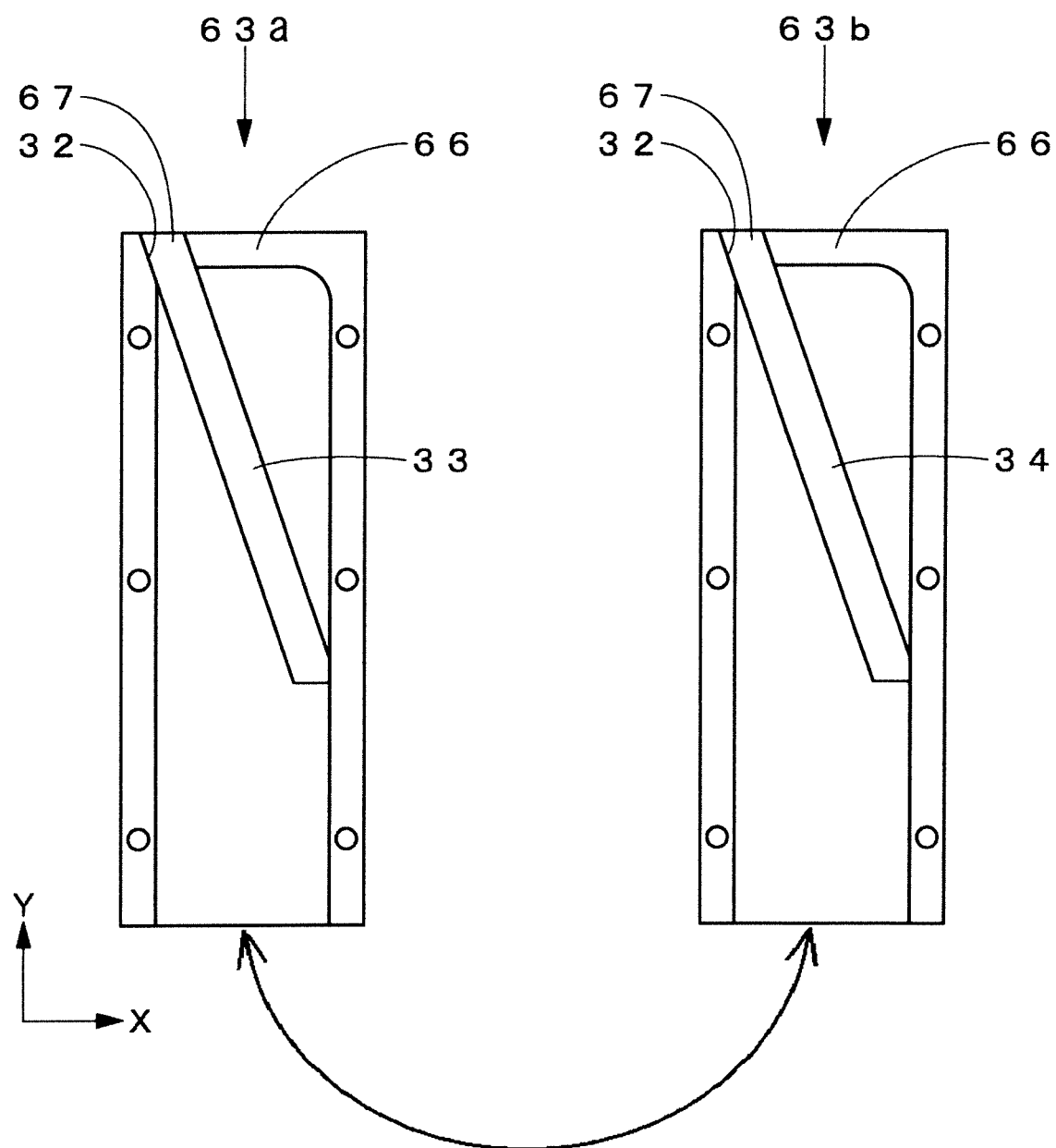
FIG. 15 is a front view of an inner side of a holder member of the undercut processing mechanism.

FIGS. 12 to 19 illustrate an undercut processing mechanism 2 according to a second embodiment of the present invention. FIG. 12 is a perspective view of the undercut processing mechanism 2. FIG. 13 is a perspective view of a retaining piece 60 and one of mold cores, which is a mold core 62, in the undercut processing mechanism 2. FIG. 14 is a perspective view of a holder 63 of the undercut processing mechanism 2. FIG. 15 is a front view of inner sides of holder members 63a, 63b of the undercut processing mechanism 2.

Figure 16:
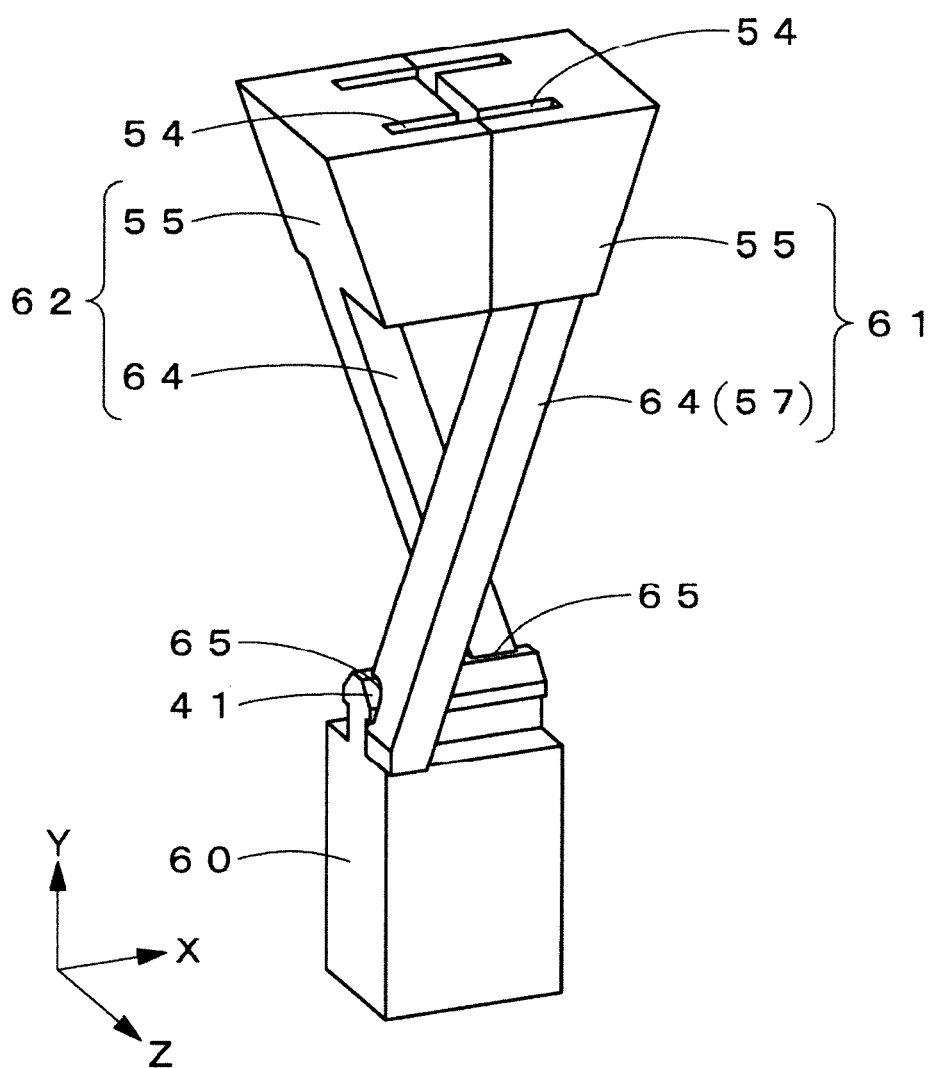
FIG. 16 is a perspective view of the retaining piece and the mold cores in a state where the undercut processing mechanism is closed.
Figure 17:
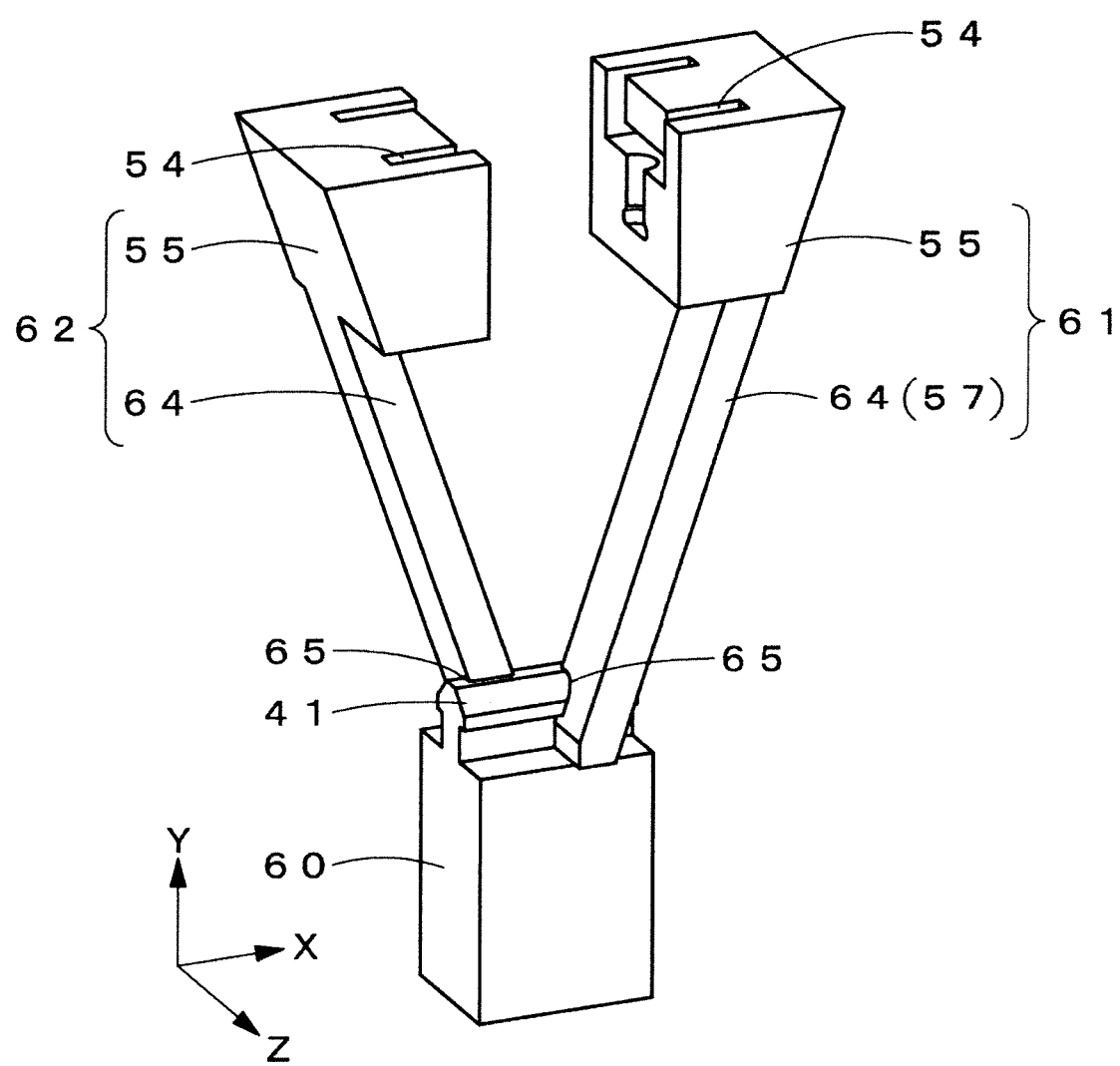
FIG. 17 is a perspective view of the retaining piece and the mold cores in a state where the undercut processing mechanism is opened.
Figure 18:
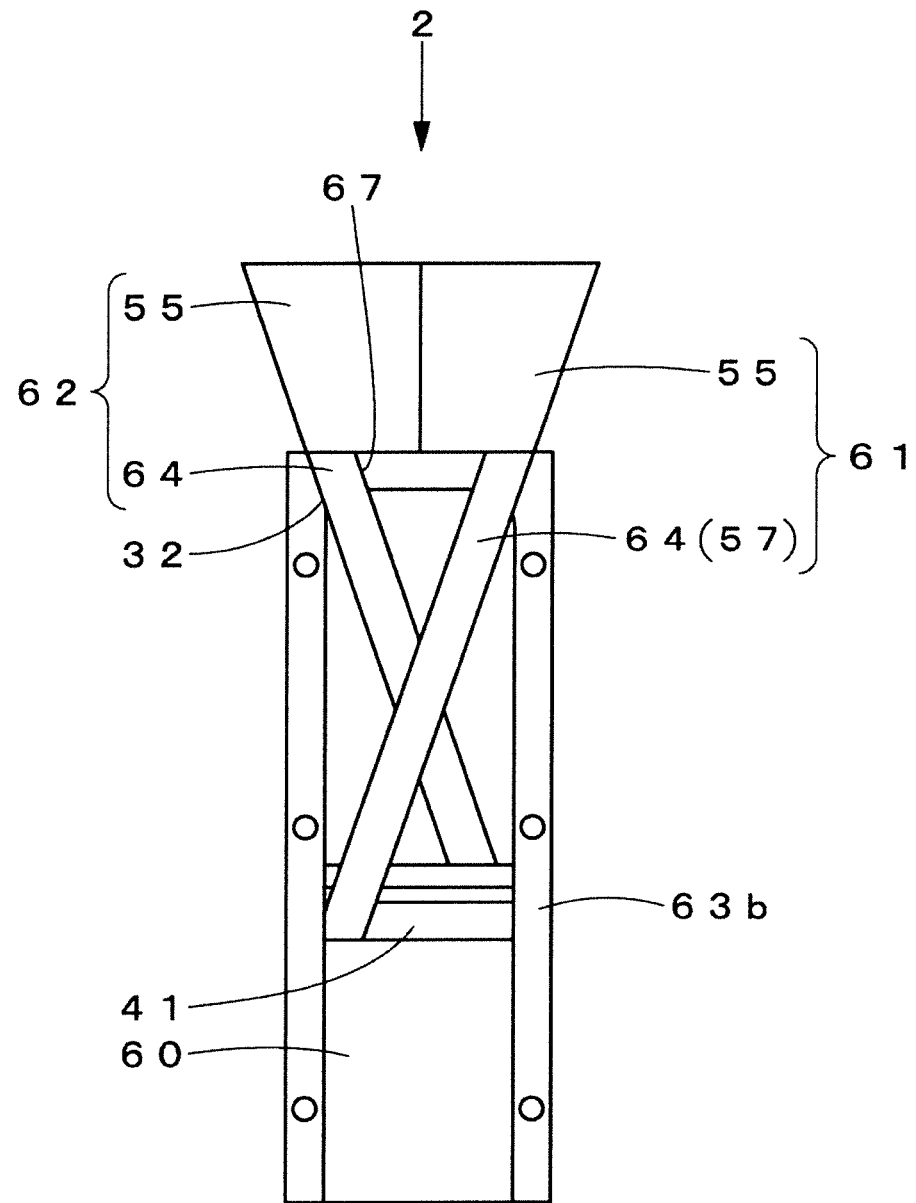
FIG. 18 is a front view of an inner side of the undercut processing mechanism in a closed state.
Figure 19:
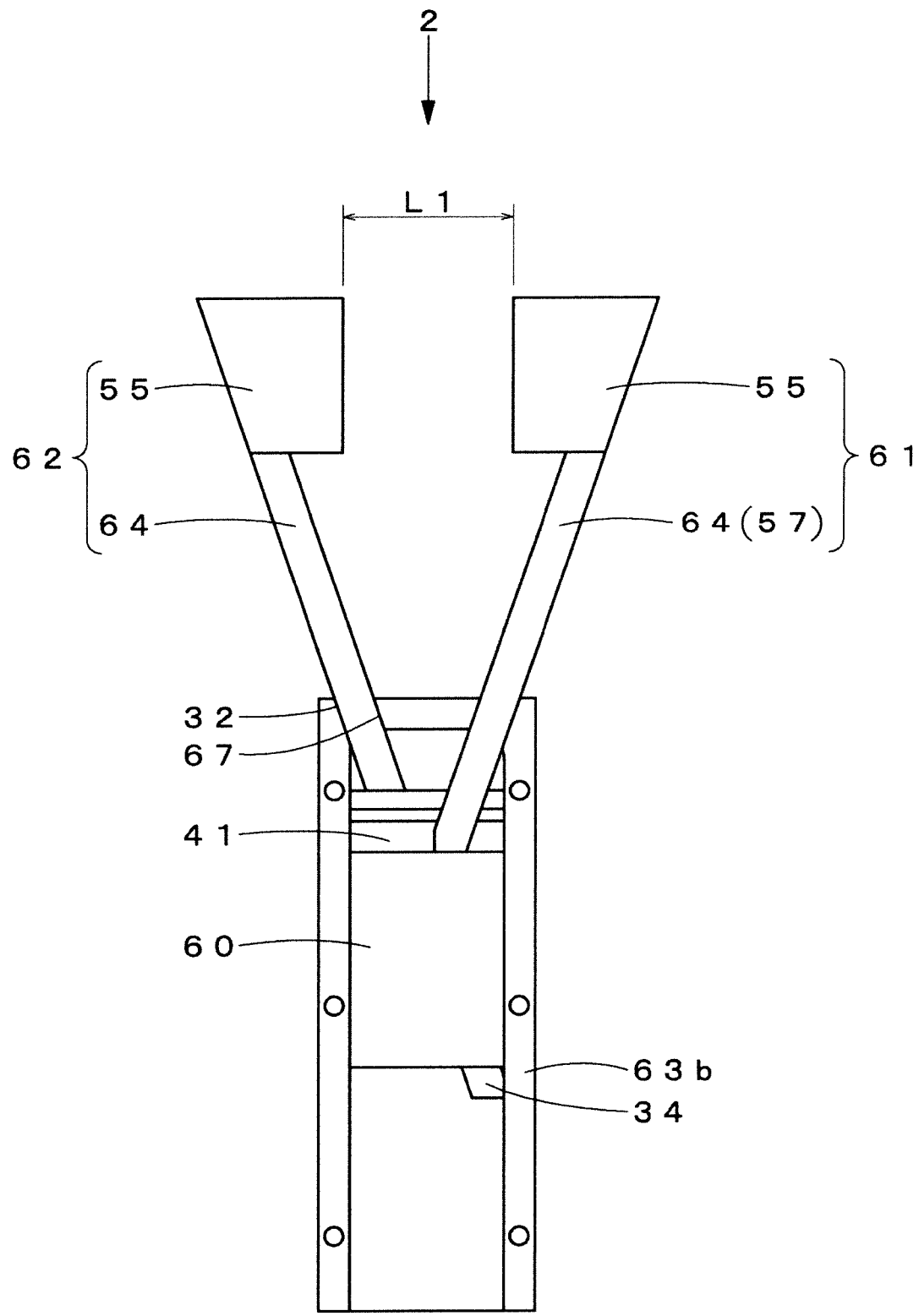
FIG. 19 is a front view of an inner side of the undercut processing mechanism in an opened state.

FIG. 16 is a perspective view of the retaining piece 60 and mold cores 61, 62 in a state where the undercut processing mechanism 2 is closed. FIG. 17 is a perspective view of the retaining piece 60 and the mold cores 61, 62 in a state where the undercut processing mechanism 2 is opened. FIG. 18 is a front view of an inner side of the undercut processing mechanism 2 in the closed state. FIG. 19 is a front view of an inner side of the undercut processing mechanism 2 in the opened state.

In FIG. 12, FIG. 18, and FIG. 19, the holder member 63a is not shown. The same components as in the undercut processing mechanism 1 of the first embodiment shown in FIG. 1 to FIG. 9 are denoted by the same reference numerals, and the description thereof is not given. The undercut processing mechanism 2 of the second embodiment and the undercut processing mechanism 1 of the first embodiment are the same in basic structure, but are different in a structure of support member.

In the undercut processing mechanism 2 of the second embodiment, the holder 63 instead of the retaining piece 60 has support member. That is, the retaining piece 60 does not have a support wall. Therefore, a recessed groove 65 provided at the base end of a sliding piece 64 of each of the mold cores 61, 62 engages slidably with the projection 41 provided in the retaining piece 60 such that the mold core is held at one side thereof.

The tapers 32 are formed in the holder members 63a, 63b of the holder 63. The taper 32 is formed from the upper end (one end in the Y direction) of the inner surface of each of the holder members 63a, 63b to the intermediate portion (Y direction) thereof. The holder 63 has end portion walls 66 that close the upper ends (one end in the Y direction) of the holder members 63a, 63b. Openings 67 through which the sliding pieces 64 of the mold cores 61, 62 pass are formed in a portion of the end portion walls 66. In the undercut processing mechanism 2 of the second embodiment, the support member of the present invention is formed by both of the edges of the openings 67 through which the sliding pieces 64 slide and the end surface of the holder 63 (the holder members 63a, 63b). When the mold cores 61, 62 are opened and closed, the support member of the second embodiment comes into surface contact with the sliding pieces 64, and supports the sliding pieces 64 so as not to prevent the mold cores 61, 62 from being tilted.

The support member of the present invention is not limited to a specific structure, and may be structured as appropriate according to the structure of the undercut processing mechanism so as to prevent the mold core (shaping piece) from being tilted over the entirety of the opening and closing stroke. For example, the support member of the present invention may be implemented by a protrusion, a pin, a thickened portion, a padding portion, a projection, a dovetail groove or the like, which is provided in the sliding piece, the retaining piece and/or the holder. The support member of the present invention may be provided in the movable mold (or the stationary mold) of the molding die.

Figure 20:
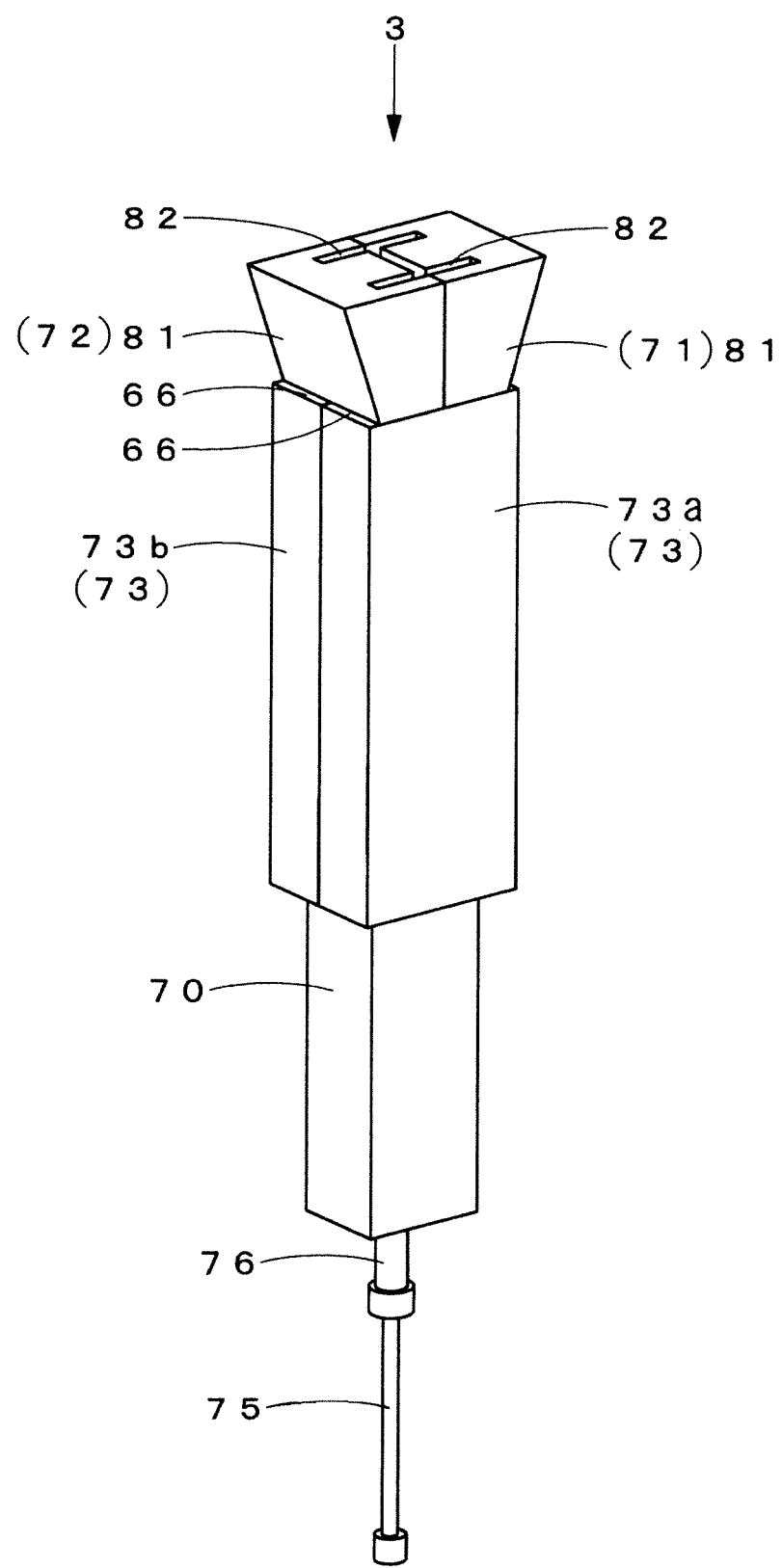
FIG. 20 is a perspective view of an undercut processing mechanism according to a third embodiment of the present invention.
Figure 21:
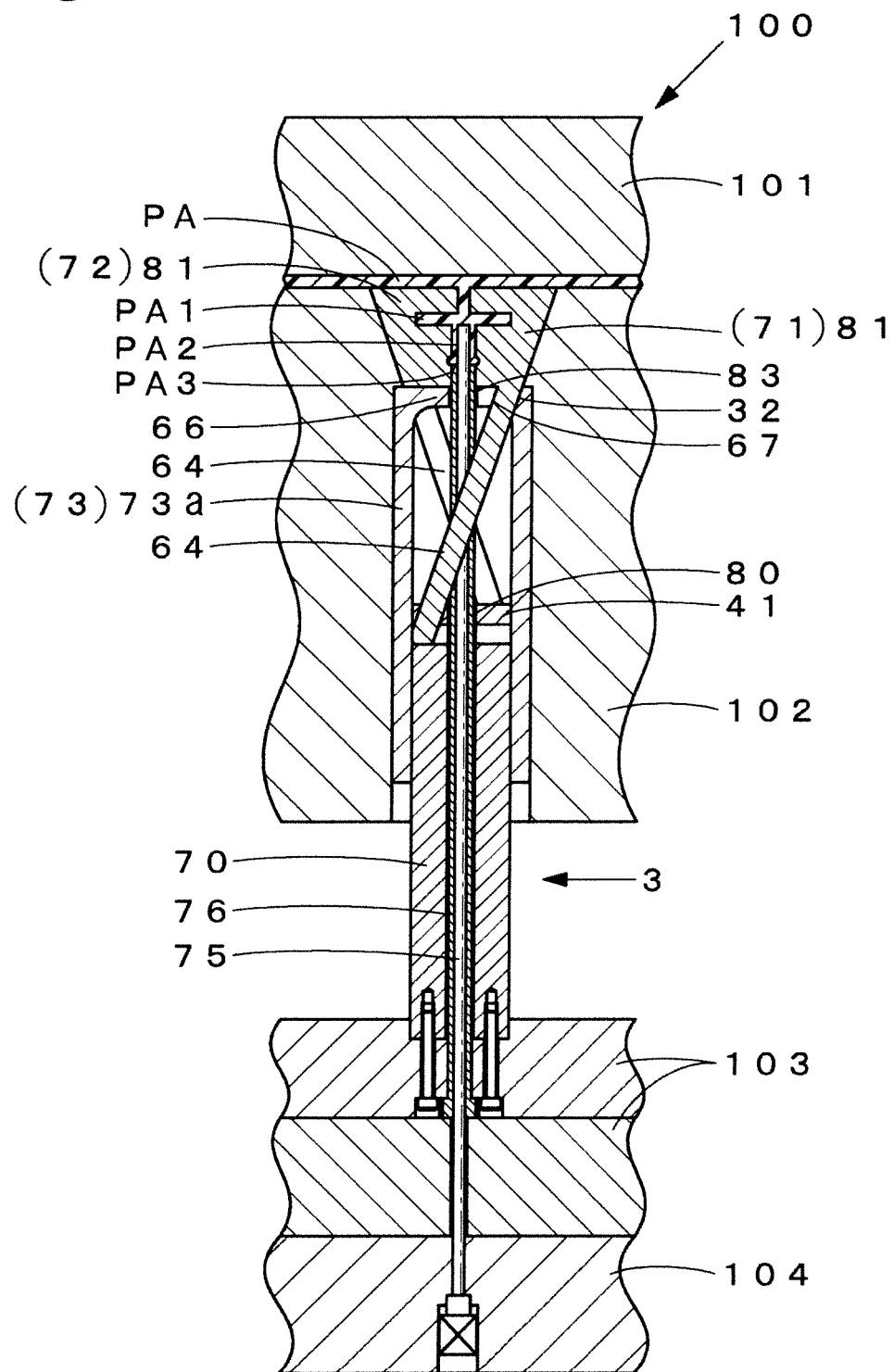
FIG. 21 is a longitudinal cross-sectional view illustrating a state where a molded product is formed by the undercut processing mechanism.
Figure 22:
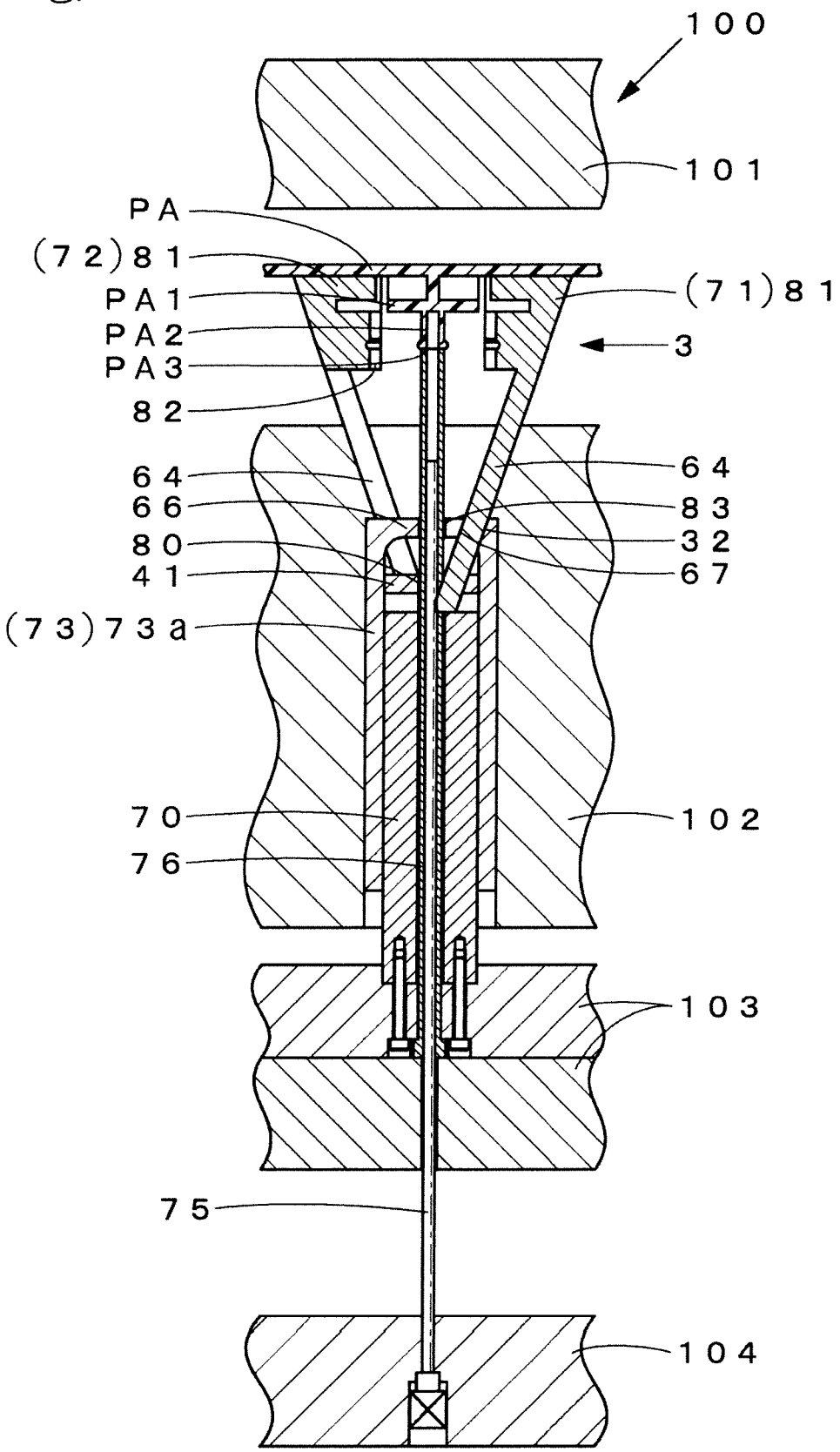
FIG. 22 is a longitudinal cross-sectional view illustrating a state where the molded product has been demolded by the undercut processing mechanism.

FIGS. 20 to 22 illustrate an undercut processing mechanism 3 according to a third embodiment of the present invention. FIG. 20 is a perspective view of the undercut processing mechanism 3. FIG. 21 is a longitudinal cross-sectional view illustrating a state where a molded product PA is formed by the undercut processing mechanism 3. FIG. 22 is a longitudinal cross-sectional view illustrating a state after demolding of the molded product PA. The same components as in the undercut processing mechanism 2 of the second embodiment shown in FIG. 12 to FIG. 19 are denoted by the same reference numerals, and the description thereof is not given.

The undercut processing mechanism 3 of the third embodiment and the undercut processing mechanism 2 of the second embodiment are the same in basic structure, but are different in that, in the undercut processing mechanism 3, the end portion of an undercut portion PA1 of the molded product PA is formed as a cylindrical boss having a hollow portion PA2. According thereto, shapes of a retaining piece 70, mold cores 71, 72 and a holder 73 are changed. Further, a long columnar core pin 75 for forming the hollow portion PA2 of the cylindrical boss, and a long cylindrical sleeve pin 76 for forming and supporting a tip end surface PA3 of the cylindrical boss are provided.

A molding die 100 shown in FIG. 21 and FIG. 22 includes a stationary mold 101, a movable mold 102, two ejector base plates 103 and a movable mounting plate 104 in order, respectively, starting from the upper portion in the drawing sheet. The movable mold 102 is fixed to the movable mounting plate 104 via a spacer block (not shown). Therefore, by the movable mounting plate 104 being moved upward and downward, the movable mold 102 is moved upward and downward relative to the stationary mold 101. The ejector base plates 103 are moved upward and downward between the movable mold 102 and the movable mounting plate 104 in synchronization with the movable mounting plate 104. The structure of the molding die 100 is not limited thereto. The molding die 100 may be structured such that, for example, the lower mold 102 is stationary, and the upper mold 101 is moved upward and downward relative to the lower mold 102.

The retaining piece 70 has the entire length that is elongated since the upward and downward movement stroke is greater as compared to the retaining piece 60 of the undercut processing mechanism 2 according to the second embodiment. The base end of the retaining piece 70 is fixed to the ejector base plates 103 of the molding die 100. The retaining piece 70 has an insertion hole 80 through which the sleeve pin 76 is inserted. The insertion hole 80 is formed on the center axis along the longitudinal direction of the retaining piece 70.

Recesses 82 are formed in the shaping pieces 81 of the mold cores 71, 72 such that the tip of the sleeve pin 76 as well as the undercut portion PA1 of the molded product PA is fitted into the recesses 82 during molding.

The holder 73 is fixed to the movable mold 102 of the molding die 100. An insertion hole 83 into which the sleeve pin 76 is inserted is formed at the center of the end portion wall 66 of the holder 73. Specifically, semicircular cut portions are formed in the end portion walls 66 of the holder members 73a, 73b, respectively. Each of the cut portions penetrates through the end portion wall 66. When the holder members 73a, 73b are connected, the circular insertion hole 83 is formed by the two semicircular cut portions.

The core pin 75 is inserted so as to be movable relative to the sleeve pin 76 in the longitudinal direction. The base end of the core pin 75 is fixed to the movable mounting plate 104 of the molding die 100, and the core pin 75 is moved upward and downward in conjunction with the movable mounting plate 104.

The base end of the sleeve pin 76 is fixed to the ejector base plates 103 of the molding die 100. The sleeve pin 76 is inserted in the insertion hole 80 of the retaining piece 70 and the insertion hole 83 of the holder 73. The length of the sleeve pin 76 is set such that the tip end surface PA3 of the cylindrical boss of the molded product PA is formed during molding, and the tip end surface PA3 of the cylindrical boss of the molded product PA can be supported by the tip end surface of the sleeve pin 76 over the entire stroke during demolding.

The basic operation of the undercut processing mechanism 3 is the same as those of the undercut processing mechanisms 1 and 2 of the first and the second embodiments, and the description thereof is not given.

By the structure of the undercut processing mechanism 3 according to the third embodiment of the present invention, the molded product PA having the undercut portion PA1 that includes the cylindrical boss having the hollow portion PA2 can be formed. By the shapes of the retaining piece 70, the mold cores 71, 72, the holder 73, the core pin 75 and the sleeve pin 76 being changed as appropriate, a molded product having an undercut portion that includes a hollow portion other than the cylindrical boss can be also formed.

By the undercut processing mechanism 3 according to the third embodiment, when the molded product PA having the cylindrical boss is demolded, the tip end surface PA3 of the cylindrical boss can be supported by the tip end surface of the sleeve pin 76 over the entire stroke. Thus, molding defect in the molded product PA can be effectively inhibited.

Figure 23:
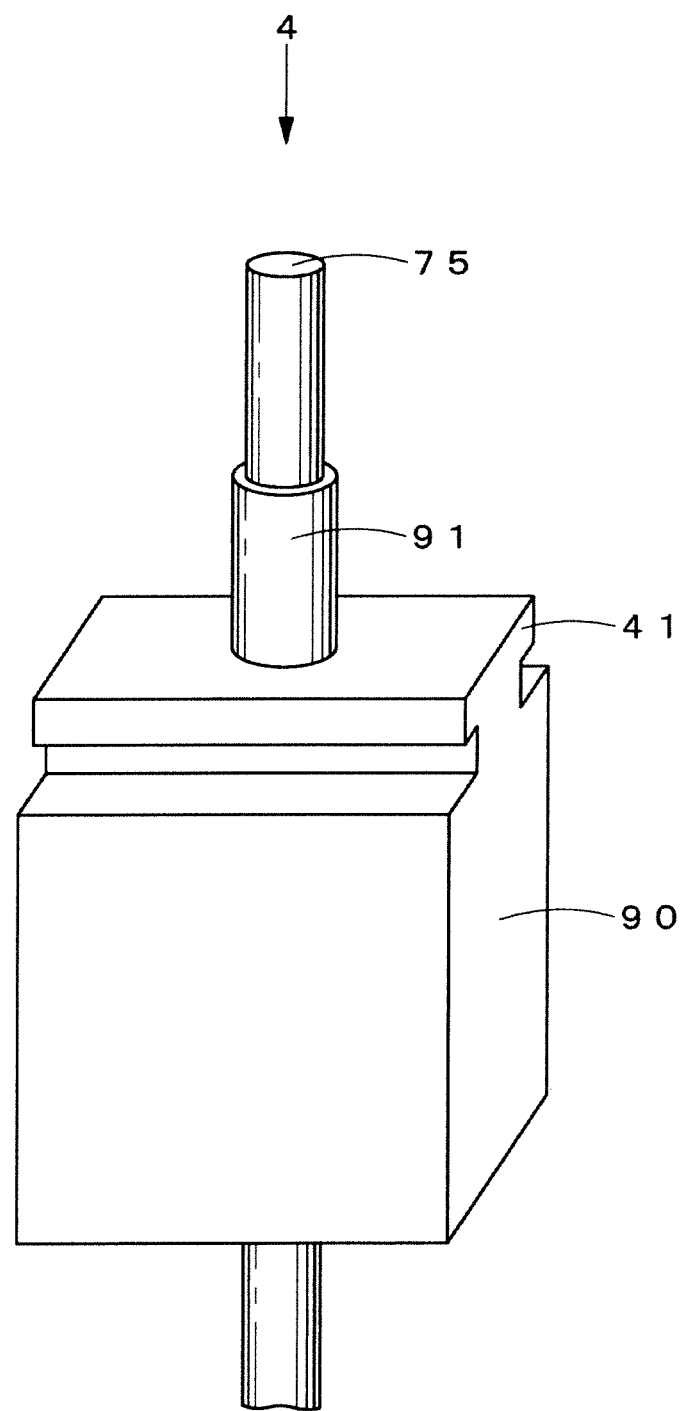
FIG. 23 is an enlarged perspective view of a main portion of an undercut processing mechanism according to a fourth embodiment of the present invention.

FIG. 23 is an enlarged perspective view of a main portion of an undercut processing mechanism 4 according to a fourth embodiment of the present invention. The same components as in the undercut processing mechanism 3 according to the third embodiment shown in FIG. 20 to FIG. 22 are denoted by the same reference numerals, and the description thereof is not given. The undercut processing mechanism 4 of the fourth embodiment and the undercut processing mechanism 3 of the third embodiment are the same in basic structure, but are different in that, in the undercut processing mechanism 4, a retaining piece 90 has, instead of the sleeve pin 76, a sleeve portion 91 in which the core pin 75 is inserted.

In the undercut processing mechanism 4 of the fourth embodiment, when the molded product PA having the cylindrical boss is demolded, the tip end surface PA3 of the cylindrical boss is supported by the tip end surface of the sleeve portion 91 of the retaining piece 90. The undercut processing mechanism 4 can be structured so as to be compact as compared to a case where the sleeve pin 76 is used as in the undercut processing mechanism 3 of the third embodiment.

Figure 24:
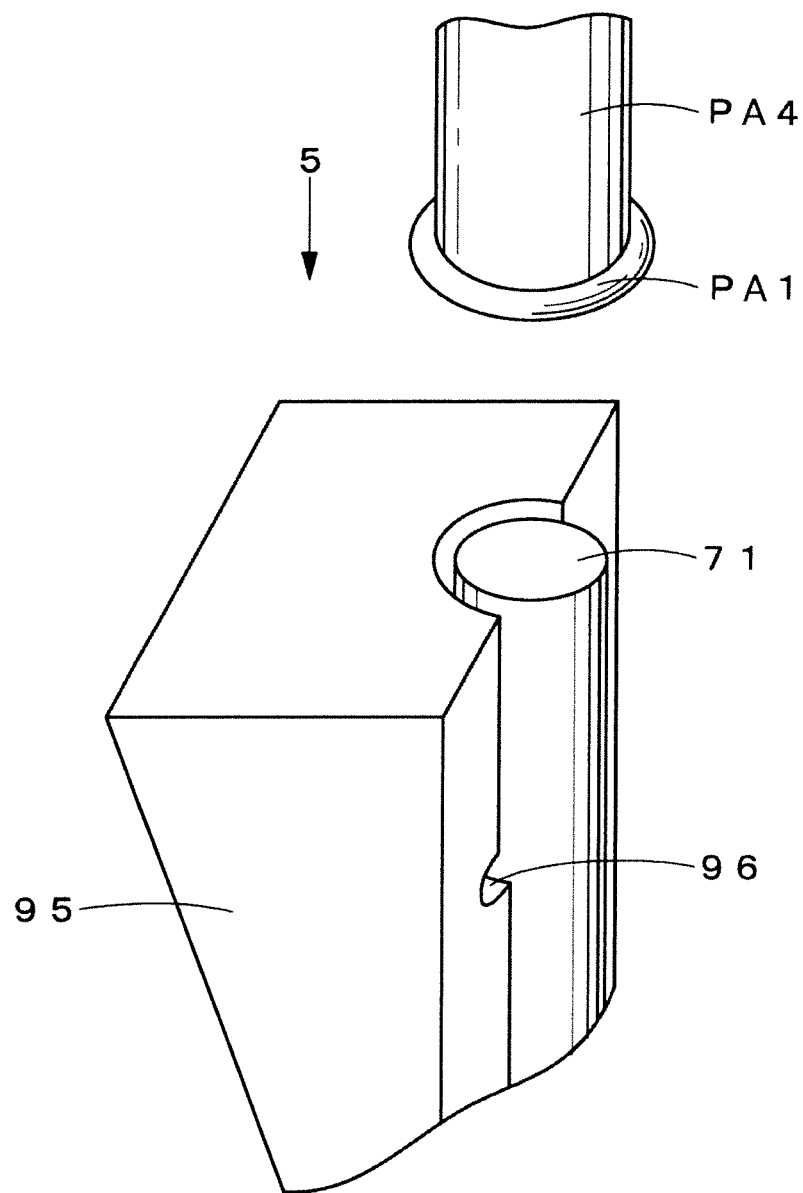
FIG. 24 is an enlarged perspective view of a main portion of an undercut processing mechanism according to a fifth embodiment of the present invention.

FIG. 24 is an enlarged perspective view of a main portion of an undercut processing mechanism 5 according to a fifth embodiment of the present invention. The same components as in the undercut processing mechanism 3 according to the third embodiment shown in FIG. 20 to FIG. 22 are denoted by the same reference numerals, and the description thereof is not given. The undercut processing mechanism 5 of the fifth embodiment and the undercut processing mechanism 3 of the third embodiment are the same in basic structure, but are different in that, in the undercut processing mechanism 5, the tip end surface of a cylindrical boss of a molded product PA4 having the cylindrical boss is formed by a recess 96 of a shaping piece 95, instead of the sleeve pin 76.

By the undercut processing mechanism 5 of the fifth embodiment, the sleeve pin need not be provided for forming the molded product PA4 having the cylindrical boss. Thus, the structure can be made compact. Meanwhile, a mechanism that supports the tip end surface of the cylindrical boss when the molded product PA4 is demolded, is not provided. Therefore, the undercut processing mechanisms 3 and 4 according to the third and the fourth embodiments are superior in view of molding defect being inhibited.

Figure 25:
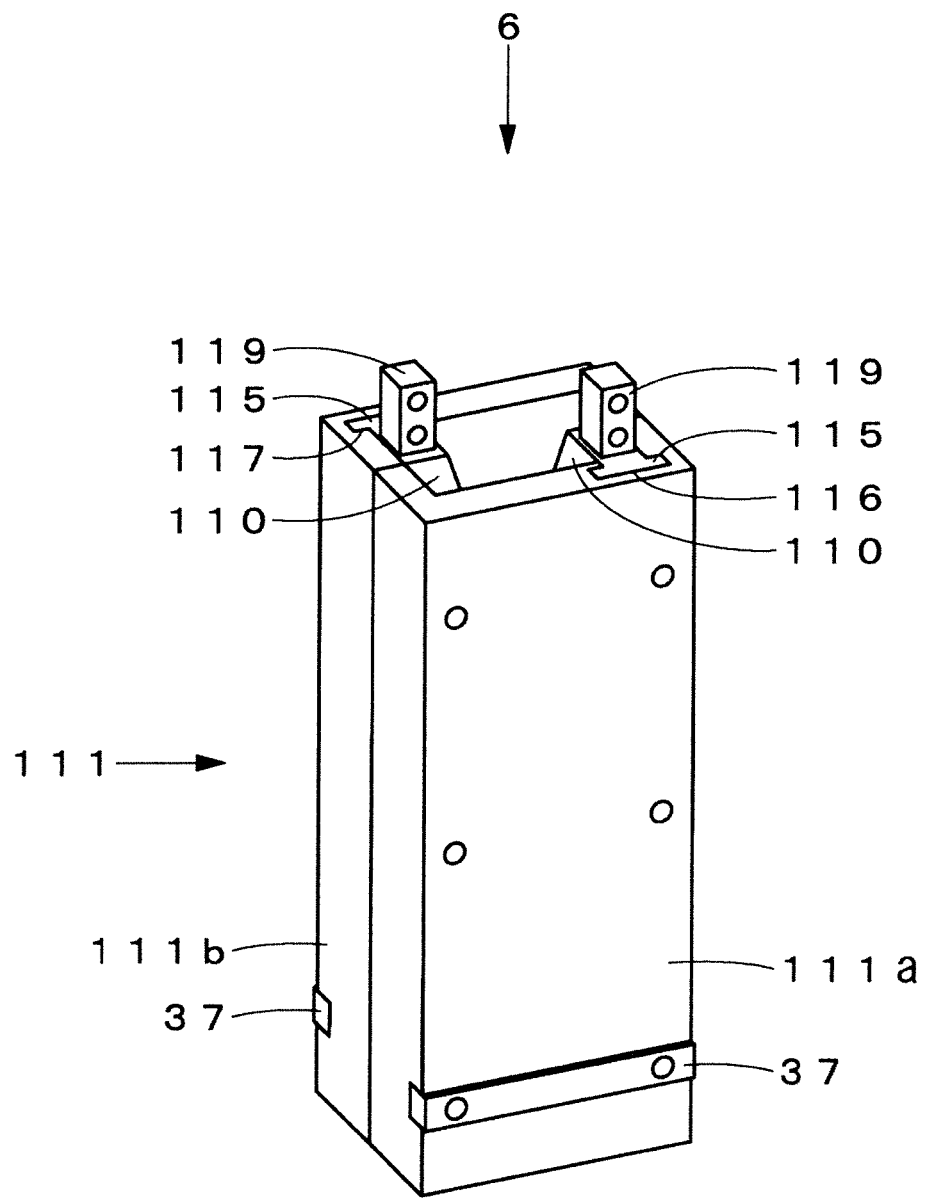
FIG. 25 is a perspective view of an undercut processing mechanism, in a closed state, according to a sixth embodiment of the present invention.
Figure 26:
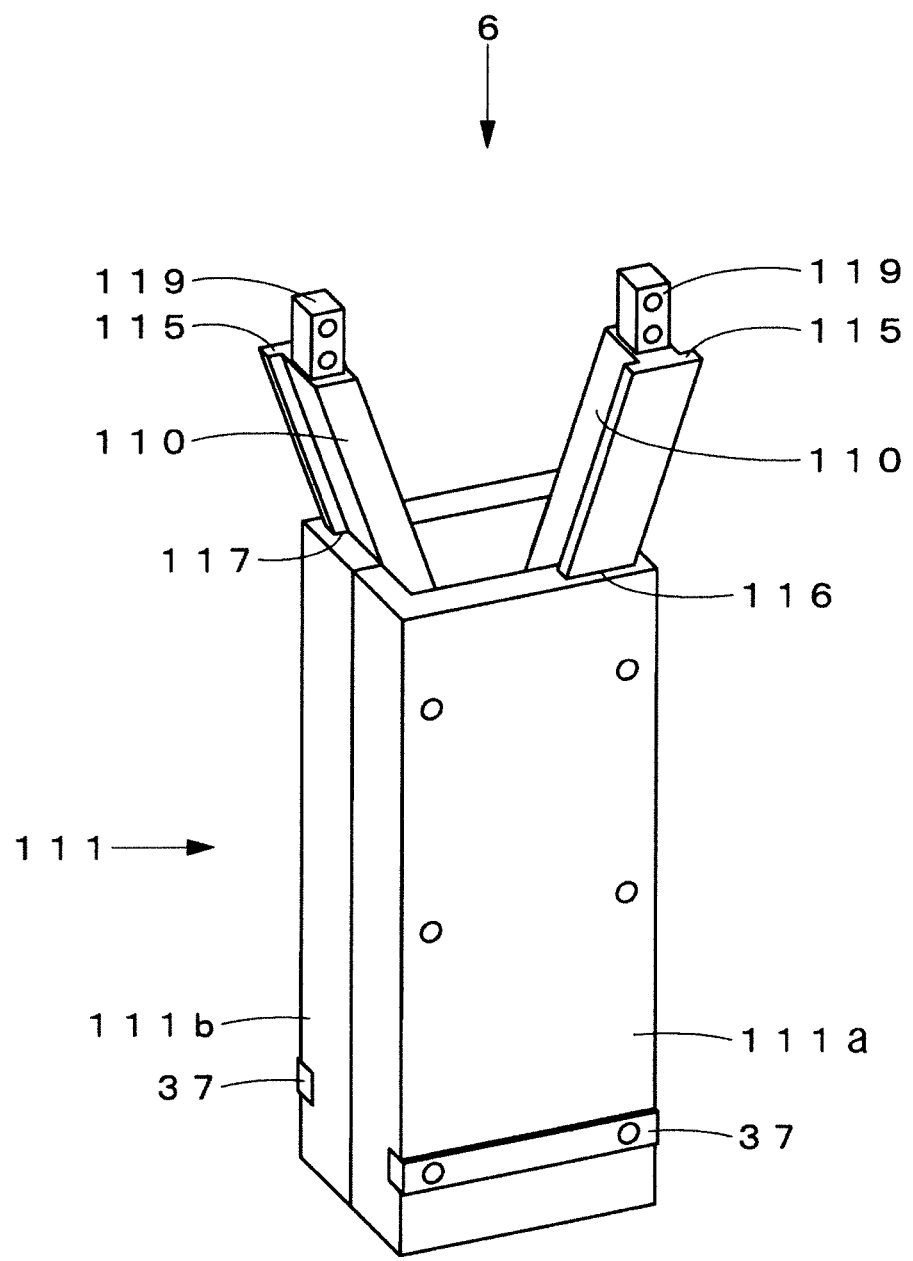
FIG. 26 is a perspective view of the undercut processing mechanism, in an opened state.

FIG. 25 and FIG. 26 illustrate an undercut processing mechanism 6 according to a sixth embodiment of the present invention. FIG. 25 is a perspective view of the undercut processing mechanism 6 in a closed state. FIG. 26 is a perspective view of the undercut processing mechanism 6 in an opened state. The same components as in the undercut processing mechanism 1 according to the first embodiment shown in FIG. 1 to FIG. 11 are denoted by the same reference numerals, and the description thereof is not given. The undercut processing mechanism 6 of the sixth embodiment and the undercut processing mechanism 1 of the first embodiment are the same in basic structure, but are different in that, in the undercut processing mechanism 6, sliding pieces 110 are prevented from being tilted by the sliding pieces 110 and a holder 111 engaging with each other.

In the undercut processing mechanism 6 according to the sixth embodiment, projections 115 are formed on the outer walls of the sliding pieces 110 that slide relative to the inner wall of the holder 111. A first diagonal groove 116 and a second diagonal groove 117 are formed, into dovetail grooves, in the inner walls of holder members 111a and 111b, respectively. The projections 115 of the sliding pieces 110 engage with and slide in the first diagonal groove 116 and the second diagonal groove 117.

In FIG. 25 and FIG. 26, a shaping piece is not shown. The shaping piece is attached to an attaching portion 119 provided at the end portion of each sliding piece 110. That is, when the undercut processing mechanism 6 is incorporated in a molding die, a shaping piece corresponding to a shape of a molded product is attached and fixed to the attaching portion 119 of each sliding piece 110 as appropriate, to form a mold core. In the undercut processing mechanism 6 of the sixth embodiment, a not-illustrated retaining piece may be the retaining piece 40 having the support wall 43, or may be the retaining piece 60 having no support wall.

The undercut processing mechanism, the molding die and the molded product of the present invention are described above by using the undercut processing mechanisms 1 to 6 according to the first to the sixth embodiments. However, the undercut processing mechanism, the molding die and the molded product of the present invention are not limited to the above-described embodiments, and may be modified without departing from the gist of the invention, and the modified ones can be used. For example, the shapes of the undercut processing mechanisms 1 to 6 are not limited to the illustrated shapes.

In the undercut processing mechanism of the present invention, the retaining piece 40, 60 is not limited to the retaining piece that is separate from the ejector pin 20 and is combined later with the ejector pin 20, and may be structured such that the retaining piece 40, 60 is previously integrated with the tip side portion of the ejector pin 20.

The holder 30, 63, 73, 111 may be provided in a stationary mold of the molding die so as to be integrated with the stationary mold, instead of a movable mold thereof. The holder 30, 63, 73 itself may be formed integrally with a movable mold (or a stationary mold) as a part of the movable mold (or the stationary mold).

In the undercut processing mechanism of the present invention, the projection may be formed in the mold core, and the recessed groove may be formed, as the retaining portion, in the retaining piece. The retaining portion of the retaining piece is not limited to a projection or a recessed groove, and may have any structure that allows the sliding piece of the mold core to be retained such that the sliding piece is movable.

In the undercut processing mechanism of the present invention, the number of the mold cores is not limited to a specific number, and may be one, or three or more. The diagonal direction in which the sliding piece of the mold core is moved is not limited to a specific diagonal direction. For example, the diagonal direction may be such a direction as to move the two mold cores parallel with each other, orthogonal to each other (for example, one of the mold cores is moved in the X direction and the other of the mold cores is moved in the Z direction), or other directions different to each other. At this time, the guiding member of the holder, the projection of the retaining piece and the like are formed so as to guide the sliding piece according to a direction in which the sliding piece is moved.

In the undercut processing mechanism of the present invention, the corner and the side edge of each component may be, for example, rounded or chamfered.

The materials of the components used for the undercut processing mechanism and the molding die according to the present invention are not limited to specific materials, and the same materials as those of components which are used in known undercut processing mechanisms and molding dies may be used as appropriate. However, the sliding surface of each component is preferably formed from a material having a good slidability or a material that has been subjected to good surface treatment. Each sliding surface may be brought into line contact or point contact as well as surface contact.

The undercut processing mechanism of the present invention can be applied to a molding die that is opened and closed in the right-left direction or in another direction, as well as a molding die that is opened and closed in the up-down direction.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS 1, 1A, 2, 3, 4, 5, 6 . . . undercut processing mechanism
30, 63, 73, 111 . . . holder
40, 60, 70, 90 . . . retaining piece
41 . . . projection
43 . . . support wall
53, 64, 110 . . . sliding piece
55, 81, 95 . . . shaping piece
66 . . . end portion wall
67 . . . opening
75 . . . core pin
115 . . . projection
116 . . . first diagonal groove
117 . . . second diagonal groove
P, PA, PA4 . . . molded product
P1, PA1 . . . undercut portion

What is claimed is:
1. An undercut processing mechanism that is attached to and used in a molding die for forming a molded product having an undercut portion, the undercut processing mechanism allowing the undercut portion to be demolded, the undercut processing mechanism comprising:
  a holder attached to the molding die or formed integrally with the molding die;
  a sliding piece configured to form a part of a mold core for forming the undercut portion, the sliding piece being configured to be slidable relative to the holder such that the mold core is moved so as to demold the undercut portion;
  a retaining piece configured to retain the sliding piece such that the sliding piece is slidable; and
  a support member configured to support the sliding piece so as to prevent the sliding piece from being tilted when the sliding piece slides, wherein
a projection is formed on an upper end surface of the retaining piece so as to project from the upper end surface of the retaining piece in a demolding direction,
the projection extends along the upper end surface of the retaining piece in a mold opening direction,
the projection is connected to the sliding piece so as to allow the sliding piece to move along the mold opening direction,
the retaining piece includes a plate-shaped support wall formed on an upper surface of the projection so as to project from the upper surface of the projection in the demolding direction, and
the plate-shaped support wall forms the support member.

2. The undercut processing mechanism as claimed in claim 1, further comprising a shaping piece, attached to the sliding piece or formed integrally with the sliding piece, the shaping piece being configured to form a part of the mold core and have a shaping surface along a part of the molded product including the undercut portion.

3. The undercut processing mechanism as claimed in claim 1, further comprising another sliding piece slidably retained by the retaining piece.

4. The undercut processing mechanism as claimed in claim 1, wherein the support member is configured to support the sliding piece over the entirety of an opening and closing stroke so as to prevent the sliding piece from being tilted when the sliding piece slides.

5. The undercut processing mechanism as claimed in claim 1, further comprising a guiding member provided in the holder and configured to movably guide the mold core.

6. A molding die comprising the undercut processing mechanism as claimed in claim 1.

7. An undercut processing mechanism that is attached to and used in a molding die for forming a molded product having an undercut portion, the undercut processing mechanism allowing the undercut portion to be demolded, the undercut processing mechanism comprising:
a holder attached to the molding die or formed integrally with the molding die;
a sliding piece configured to form a part of a mold core for forming the undercut portion, the sliding piece being configured to be slidable relative to the holder such that the mold core is moved so as to demold the undercut portion;
a retaining piece configured to retain the sliding piece such that the sliding piece is slidable; and
a support member configured to support the sliding piece so as to prevent the sliding piece from being tilted when the sliding piece slides,
wherein
an outer wall of the sliding piece slides relative to an inner wall of the holder,
a projection is formed on the outer wall of the sliding piece or in the inner wall of the holder, so as to protrude outward in a direction perpendicular to both a demolding direction and a mold opening direction, the projection including a portion which protrudes from a first end part of the projection in the mold opening direction,
a diagonal groove is formed in the inner wall of the holder or in the outer wall of the sliding piece, and has a shape such that the projection is accommodated in the diagonal groove,
the projection engages with and slides in the diagonal groove, and
the projection and the diagonal groove cooperate together to form the support member.

8. The undercut processing mechanism as claimed in claim 7, wherein the projection includes another portion which protrudes from a second end part of the projection, opposite of the first end part, such that the projection has a dovetail shape.

9. The undercut processing mechanism as claimed in claim 7, wherein
a protrusion is formed on an upper end surface of the retaining piece so as to protrude from the upper end surface of the retaining piece in the demolding direction,
the protrusion extends along the upper end surface of the retaining piece in the mold opening direction,
the protrusion is connected to the sliding piece so as to allow the sliding piece to move along the mold opening direction, and
the retaining piece includes a plate-shaped support wall formed on an upper surface of the protrusion so as to protrude from the upper surface of the protrusion in the demolding direction and is configured to support the sliding piece so as to prevent the sliding piece from being tilted when the sliding piece slides.

10. A molding die comprising the undercut processing mechanism as claimed in claim 7.

* * * * *